United States Patent
Kosugi

(10) Patent No.: US 8,956,050 B2
(45) Date of Patent: Feb. 17, 2015

(54) ROLLING BEARING AND ROLLING BEARING ASSEMBLY

(75) Inventor: Futoshi Kosugi, Kuwana (JP)

(73) Assignee: NTN Corporation, Osaka (JP)

( * ) Notice: Subject to any disclaimer, the term of this patent is extended or adjusted under 35 U.S.C. 154(b) by 44 days.

(21) Appl. No.: 13/879,929

(22) PCT Filed: Oct. 13, 2011

(86) PCT No.: PCT/JP2011/073485
§ 371 (c)(1),
(2), (4) Date: Apr. 17, 2013

(87) PCT Pub. No.: WO2012/053410
PCT Pub. Date: Apr. 26, 2012

(65) Prior Publication Data
US 2013/0202237 A1    Aug. 8, 2013

(30) Foreign Application Priority Data

Oct. 21, 2010   (JP) ................... 2010-236065
Sep. 22, 2011   (JP) ................... 2011-207084
Oct. 6, 2011    (JP) ................... 2011-221461

(51) Int. Cl.
*F16C 33/66* (2006.01)
*F16C 33/58* (2006.01)
*F16C 19/16* (2006.01)
*F16C 19/54* (2006.01)

(52) U.S. Cl.
CPC ............. *F16C 33/6659* (2013.01); *F16C 33/58* (2013.01); *F16C 19/163* (2013.01); *F16C 19/548* (2013.01)
USPC ........................................ 384/475

(58) Field of Classification Search
USPC ........................................ 384/473–475, 468
See application file for complete search history.

(56) References Cited

U.S. PATENT DOCUMENTS

| | | | | |
|---|---|---|---|---|
| 3,885,842 | A | * | 5/1975 | Furutsu ............... 384/468 |
| 4,669,894 | A | * | 6/1987 | Hallerback ............ 384/475 |
| 6,105,724 | A | * | 8/2000 | Stitz et al. ............. 384/475 |
| 2006/0239598 | A1 | * | 10/2006 | Matsuyama et al. ...... 384/462 |

FOREIGN PATENT DOCUMENTS

| | | |
|---|---|---|
| JP | 63-180726 | 11/1988 |
| JP | 5-263830 | 10/1993 |
| JP | 2002-161922 | 6/2002 |
| JP | 2009-41676 | 2/2009 |
| JP | 2010-1921 | 1/2010 |

OTHER PUBLICATIONS

PCT International Preliminary Report on Patentability mailed May 16, 2013 in corresponding International Application No. PCT/JP2011/073485.
International Search Report of PCT/JP2011/073485 mailed Jan. 17, 2012.

* cited by examiner

Primary Examiner — Thomas R. Hannon

(57) ABSTRACT

A rolling bearing includes rolling elements interposed between rolling surfaces of an inner ring and an outer ring. An oil supply hole for lubricant oil supply is provided in the outer ring so as to communicate between an outer diameter surface of the outer ring and a position, near the rolling surface, in an inner peripheral surface of the outer ring. A circumferential groove is provided on the outer diameter surface of the outer ring so as to communicate with the oil supply hole to introduce, to the oil supply hole, a lubricant oil supplied from a circumferential position outside the bearing that is different from that of the oil supply hole.

10 Claims, 18 Drawing Sheets

US 8,956,050 B2

ROLLING BEARING AND ROLLING BEARING ASSEMBLY

CROSS REFERENCE TO THE RELATED APPLICATION

This application is a U.S. national stage application of PCT/JP2011/073485 filed Oct. 13, 2011 and claims foreign priority benefit to Japanese patent application No. 2010-236065, filed Oct. 21, 2010, Japanese patent application No. 2011-207084, filed Sep. 22, 2011, and Japanese patent application No. 2011-221461, filed Oct. 6, 2011, the entire disclosures of which are herein incorporated by reference as a part of this application

BACKGROUND OF THE INVENTION

1. Field of the Invention

The present invention relates to a rolling bearing and a rolling bearing assembly used, for example, for supporting a machine tool main shaft or the like.

2. Description of Related Art

For a rolling bearing, there is a technique in which an oil supply hole is provided in an outer ring so as to communicate between an outer diameter portion and an inner diameter portion and an oil is supplied through the oil supply hole (Patent Document 1). For example, a rolling bearing used for supporting a machine tool main shaft or the like is rotated at a high speed in an air-oil lubrication system with use of the above technique.

[Prior Art Document]

[Patent Document 1] JP Laid-open Utility Model Publication No. 63-180726

FIG. 15 shows a frequency distribution result of a bearing with an inner diameter of $\phi$100 mm at 13000 min$^{-1}$. When a bearing having an outer ring provided with an oil supply hole is mounted on a main shaft or the like and rotated at a high speed in the air-oil lubrication system, there may be a problem that the noise level becomes very high depending on a flow volume of supplied air or the diameter of the oil supply hole. This noise is wind noise which is generated when air jetted from the oil supply hole collides against rolling elements then rotating at high speed, and is harsh high-frequency sound. This frequency coincides with the rolling elements passing frequency relative to the outer ring. If it is possible to reduce the level of the high-frequency noise, work can be conducted without being much bothered by the noise, even during a high speed rotation of the main shaft. That is, this leads to improvement of the working environment.

SUMMARY OF THE INVENTION

An object of the present invention is to provide a rolling bearing and a rolling bearing assembly that allow a noise level to be reduced during a high speed rotation of the bearing so as to improve a working environment.

A rolling bearing assembly according to a first construction of the present invention is a rolling bearing assembly including: a rolling bearing including rolling elements interposed between rolling surfaces of an inner ring and an outer ring; and a housing having an inner diameter surface on which the outer ring of the rolling bearing is mounted. An oil supply hole for lubricant oil supply is provided in the outer ring so as to communicate between an outer diameter surface of the outer ring and a position, near the rolling surface, in an inner peripheral surface of the outer ring. A circumferential flow passage is provided on a mounting surface between the outer diameter surface of the outer ring and the inner diameter surface of the housing on which the outer ring is mounted, the circumferential flow passage communicating with the oil supply hole and extending in a circumferential direction. A lubricant oil introduction hole is provided in the housing so as to communicate with the circumferential flow passage at a circumferential position different from that of the oil supply hole to supply a lubricant oil to the circumferential flow passage. The "position near the rolling surface" refers to a position, in the inner peripheral surface of the outer ring, on a side of non-contact between the rolling element and the outer ring with respect to the center of the rolling element, which position allows the entire lubricant oil discharged from the oil supply hole to be applied to the rolling element.

With this construction, the lubricant oil supplied from the lubricant oil introduction hole of the housing is supplied from the oil supply hole to the position near the rolling surface within the bearing via the circumferential flow passage, which is provided on the mounting surface between the outer diameter surface of the outer ring and the inner diameter surface of the housing, so as to lubricate the bearing. In other words, the lubricant oil supplied from the lubricant oil introduction hole of the housing is introduced to the oil supply hole via the circumferential flow passage, not directly to the oil supply hole. Thus, in a process where the lubricant oil flows via the circumferential flow passage, by a throttling effect or an orifice effect an air pressure is kept at a certain level (about 0.2 MPa or higher) such that the supplied air pressure is not excessively decreased. When the lubricant oil having a high supply air pressure flows into an oil supply hole, an air flow velocity thereof is decreased at an outlet of the oil supply hole. As a result, it is possible to reduce the noise level. Thus, when a main shaft or the like supported rotatably by the rolling bearing assembly is rotated at a high speed, it is possible to reduce the noise level, and therefore, a working environment can be improved.

The circumferential flow passage may be a circumferential groove provided on the outer diameter surface of the outer ring. In this case, machining the circumferential flow passage on the inner diameter surface of the housing is not required. The circumferential flow passage may be a circumferential groove provided on the inner diameter surface of the housing. In this case, machining the circumferential flow passage on an outer diameter surface of the bearing is not required.

Annular grooves may be provided on the mounting surface between the outer diameter surface of the outer ring and the inner diameter surface of the housing, and may be arranged on opposite sides of the circumferential flow passage in an axial direction, in which case an annular seal member may be provided in each annular groove. These annular seal members prevent the lubricant oil from undesirably leaking from the mounting surface.

A cross-sectional area of the circumferential flow passage obtained by viewing the circumferential flow passage that is cut by a plane including a bearing axial direction may be not less than 22% of and not greater than 53% of a cross-sectional area of the oil supply hole obtained by viewing the oil supply hole that is cut by a plane perpendicular to a direction in which the oil supply hole extends. A diameter of the oil supply hole may be not less than 1.2 mm and not greater than 1.5 mm, and a cross-sectional area of the circumferential flow passage obtained by viewing the circumferential flow passage that is cut by a plane including a bearing axial direction may be not less than 0.4 mm$^2$ and not greater than 0.6 mm$^2$. In order to reduce a noise level, an air flow volume is kept such that oil flow in a pipe is not impaired, and also, in order to decrease the air flow velocity at the outlet of the oil supply hole, the diameter of the oil supply hole is designed to be increased to about φ1.5 mm and the above described cross-sectional area of the circumferential flow passage is designed to be equivalent to that of a hole of φ0.8 mm. When the diameter φd of the oil supply hole is not less than φ1.2 mm and not greater than φ1.5 mm and the cross-sectional area E of the circumferential flow passage is not less than 0.4 mm$^2$ and not greater than 0.6 mm2 (namely, is not less than 22% of and not greater than 53% of the cross-sectional area of the oil supply hole), an effect is recognized that the air flow velocity is decreased.

In the rolling bearing assembly, the lubricant oil supplied to the lubricant oil introduction hole may be supplied in a form of air-oil or oil mist.

The two oil supply holes may be provided at 180-degree diagonal positions in the outer ring, respectively. In this case, it is possible to decrease by half the air flow volume per one oil supply hole, and accordingly, it is possible to further decrease the air flow velocity. Thus, it is possible to further reduce the noise level. In addition, since the two oil supply holes are provided at the 180-degree diagonal positions, the lubricant oil spreads in the circumferential direction via the circumferential flow passage, and hence it is possible to further enhance an effect of cooling the outer ring.

The rolling elements may be balls, an outlet of the oil supply hole may be provided at a position in the outer ring, where the lubricant oil is supplied directly to each rolling element, and the oil supply hole may be located at such a position that when a center of the rolling element is located at a circumferential position that is the same as that of a center line of the oil supply hole, an angle formed between a bearing radial direction and a straight line connecting the center of the rolling element to an intersection point between the center line of the oil supply hole and an outer diameter surface of the rolling element, in a plane including the center of the rolling element and a bearing axis, is in a range of not less than 10° and not greater than 30°.

When the angle is represented by K and the oil supply hole is located at such a position that the angle K is in a range of not less than 10° and not greater than 30°, it is possible to reduce the noise level during bearing operation more than in the case where the oil supply hole is located at such a position that the angle K is out of the above range. When the angle K is 0°, a phenomenon is observed that the noise level is rapidly increased at a certain rotation speed during bearing operation.

The number of the rolling elements provided in the rolling bearing may be an odd number, and the two oil supply holes may be provided at 180-degree diagonal positions in the outer ring, respectively. The lubricant oil supplied from the lubricant oil introduction hole of the housing is introduced to the two oil supply holes of the outer ring via the circumferential flow passage. In this case, the number of the rolling elements is an odd number and the two oil supply holes are provided at the 180-degree diagonal positions in the outer ring, respectively, and therefore, even when one rolling element blocks one of the oil supply holes, the other oil supply hole is not blocked by any rolling element. The odd number of the rolling elements are arranged at equal intervals in the circumferential direction. Thus, when the one of the oil supply holes is blocked by one rolling element, the other oil supply hole located at the 180-degree diagonal position is positioned between rolling elements adjacent to each other in the circumferential direction. Therefore, the lubricant oil supplied from the housing passes through either oil supply hole that is not blocked by any rolling element, and hence, no air flow fluctuation occurs. Thus, even when the air flow volume is not increased, it is possible to prevent the lubricant oil from becoming difficult to reach each rolling element. As a result, it is possible to reduce the noise level caused by increasing the air flow volume.

The number of the rolling elements provided in the rolling bearing may be an even number, and the two oil supply holes may be provided in the outer ring such that when a circumferential position of any one of the rolling elements coincides with that of one of the oil supply holes, the other oil supply hole is located at an outer ring circumferential position between a first rolling element near a 180-degree diagonal position with respect to the one of the oil supply holes and a second rolling element adjacent to the first rolling element. When the number of the rolling elements is an even number, if two oil supply holes are provided at 180-degree diagonal positions, respectively, in the outer ring, there is the possibility that two rolling elements block both oil supply holes. Thus, when the other oil supply hole is located at the outer ring circumferential position between the first rolling element near the 180-degree diagonal position with respect to the one of the oil supply holes and the second rolling element adjacent to the first rolling element, both oil supply holes are not simultaneously blocked by any rolling elements. Therefore, the lubricant oil supplied from the housing passes through either oil supply hole that is not blocked by any rolling element, and hence no air flow fluctuation occurs. Thus, even when the air flow volume is not increased, it is possible to prevent the lubricant oil from becoming difficult to reach each rolling element. As a result, it is possible to reduce the noise level caused by increasing the air flow volume. The rolling bearing may be an angular contact ball bearing. The rolling bearing may be a cylindrical roller bearing.

A rolling bearing according to the present invention is a rolling bearing including rolling elements interposed between rolling surfaces of an inner ring and an outer ring. An oil supply hole for lubricant oil supply is provided in the outer ring so as to communicate between an outer diameter surface of the outer ring and a position, near the rolling surface, in an inner peripheral surface of the outer ring. A circumferential groove is provided on the outer diameter surface of the outer ring so as to communicate with the oil supply hole to introduce, to the oil supply hole, a lubricant oil supplied from a circumferential position outside the bearing that is and different from that of the oil supply hole. The "position near the rolling surface" refers to a position, in the inner peripheral surface of the outer ring, on a side of non-contact between the rolling element and the outer ring with respect to the center of the rolling element, which position allows the entire lubricant oil discharged from the oil supply hole to be applied to the rolling element.

With this construction, the lubricant oil supplied from the outside of the bearing is supplied from the oil supply hole to the position near the rolling surface within the bearing via the circumferential groove of the outer ring so as to lubricate the bearing. In other words, the lubricant oil supplied from the outside of the bearing is introduced to the oil supply hole via the circumferential groove, not directly to the oil supply hole. Thus, in a process where the lubricant oil flows via the circumferential groove, by a throttling effect or an orifice effect an air pressure is kept at a certain level (about 0.2 MPa or higher) such that the supplied air pressure is not excessively decreased. When the lubricant oil having a high supply air pressure flows into an oil supply hole, an air flow velocity thereof is decreased at an outlet of the oil supply hole. As a result, it is possible to reduce the noise level. When a main shaft or the like supported rotatably by the rolling bearing assembly is rotated at a high speed, it is possible to reduce the noise level, and therefore, a working environment can be improved.

A cross-sectional area of the circumferential flow passage obtained by viewing the circumferential flow passage that is cut by a plane including a bearing axial direction may be not less than 22% of and not greater than 53% of a cross-sectional area of the oil supply hole obtained by viewing the oil supply hole that is cut by a plane perpendicular to a direction in which the oil supply hole extends, in which case a diameter of the oil supply hole may be not less than 1.2 mm and not greater than 1.5 mm, and the cross-sectional area of the circumferential flow passage obtained by viewing the circumferential flow passage that is cut by the plane including the bearing axial direction may be not less than 0.4 mm$^2$ and not greater than 0.6 mm$^2$. The rolling elements may be balls, an outlet of the oil supply hole may be provided at a position in the outer ring, where the lubricant oil is supplied directly to each rolling element, and the oil supply hole may be located at such a position that when a center of the rolling element is located at a circumferential position that is the same as that of a center line of the oil supply hole, an angle formed between a bearing radial direction and a straight line connecting the center of the rolling element to an intersection point between the center line of the oil supply hole and an outer diameter surface of the rolling element, in a plane including the center of the rolling element and a bearing axis, is in a range of not less than 10° and not greater than 30°. The lubricant oil introduced to the oil supply hole of the outer ring may be supplied in a form of air-oil.

Annular grooves may be provided on the outer diameter surface of the outer ring, and may be arranged on opposite sides of the circumferential groove, in which case an annular seal member may be provided in each annular groove. These annular seal members prevent the lubricant oil from undesirably leaking from the outer diameter surface of the outer ring.

A rolling bearing assembly according to a second construction of the present invention is a rolling bearing assembly including: a rolling bearing including rolling elements interposed between rolling surfaces of an inner ring and an outer ring; and a housing having an inner diameter surface on which the outer ring of the rolling bearing is mounted. An oil supply hole for lubricant oil supply is provided in the outer ring so as to communicate between an outer diameter surface of the outer ring and the rolling surface of the outer ring, not a position near the rolling surface of the outer ring. A circumferential flow passage is provided on a mounting surface between the outer diameter surface of the outer ring and the inner diameter surface of the housing on which the outer ring is mounted. The circumferential flow passage communicates with the oil supply hole and extends in a circumferential direction. A lubricant oil introduction hole is provided in the housing so as to communicate with the circumferential flow passage at a circumferential position different from that of the oil supply hole to supply a lubricant oil to the circumferential flow passage. The number of the rolling elements provided in the rolling bearing is an odd number. The two oil supply holes are provided at 180-degree diagonal positions in the outer ring, respectively.

With this construction, the number of the rolling elements is an odd number and the two oil supply holes are provided at the 180-degree diagonal positions in the outer ring, respectively, and therefore, even when one rolling element blocks one of the oil supply holes, the other oil supply hole is not blocked by any rolling element. Accordingly, the lubricant oil supplied from the housing passes through either oil supply hole that is not blocked by any rolling element. Therefore, the lubricant oil supplied from the housing passes through either oil supply hole that is not blocked by any rolling element, and hence, no air flow fluctuation occurs. Thus, even when the air flow volume is not increased, it is possible to prevent the lubricant oil from becoming difficult to reach each rolling element. As a result, it is possible to reduce the noise level caused by increasing the air flow volume. Since each oil supply hole communicates between the outer diameter surface of the outer ring and the rolling surface of the outer ring, the lubricant oil can be reliably supplied to each rolling element without influence of air curtain by each rolling element during bearing operation. In addition, since the two oil supply holes are provided at the 180-degree diagonal positions, respectively, in the outer ring, it is possible to uniformly cool the entire bearing.

A rolling bearing assembly according to a third construction of the present invention is a rolling bearing assembly including: a rolling bearing including rolling elements interposed between rolling surfaces of an inner ring and an outer ring; and a housing having an inner diameter surface on which the outer ring of the rolling bearing is mounted. An oil supply hole for lubricant oil supply is provided in the outer ring so as to communicate between an outer diameter surface of the outer ring and the rolling surface of the outer ring. A circumferential flow passage is provided on a mounting surface between the outer diameter surface of the outer ring and the inner diameter surface of the housing on which the outer ring is mounted, the circumferential flow passage communicating with the oil supply hole and extending in a circumferential direction. A lubricant oil introduction hole is provided in the housing so as to communicate with the circumferential flow passage at a circumferential position different from that of the oil supply hole to supply a lubricant oil to the circumferential flow passage. The number of the rolling elements provided in the rolling bearing is an even number. The two oil supply holes are provided in the outer ring such that when a circumferential position of any one of the rolling elements coincides with that of one of the oil supply holes, the other oil supply hole is located at an outer ring circumferential position between a first rolling element near a 180-degree diagonal position with respect to the one of the oil supply holes and a second rolling element adjacent to the first rolling element.

With this construction, when the other oil supply hole is located at the outer ring circumferential position between the first rolling element near the 180-degree diagonal position with respect to the one of the oil supply holes and the second rolling element adjacent to the first rolling element, both oil supply holes are not simultaneously blocked by any rolling elements. Therefore, the lubricant oil supplied from the housing passes through either oil supply hole that is not blocked by any rolling element, and hence no air flow fluctuation occurs. Thus, even when the air flow volume is not increased, it is possible to prevent the lubricant oil from becoming difficult to reach each rolling element. As a result, it is possible to reduce the noise level caused by increasing the air flow volume. Since each oil supply hole communicates between the outer diameter surface of the outer ring and the rolling surface of the outer ring, the lubricant oil can be reliably supplied to each rolling element without influence of air curtain by each rolling element during bearing operation.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

In the accompanying drawings, like reference numerals are used to denote like parts throughout the several views, and.

DESCRIPTION OF PREFERRED EMBODIMENTS

A first embodiment of the present invention will be described with reference to FIGS. 1A and 1B to FIG. 5. A rolling bearing according to the embodiment is used, for example, for supporting a machine tool main shaft, and is used in an air-oil lubrication system. However, the application of and the lubrication system for the rolling bearing are not limited thereto.

Figure 1A:
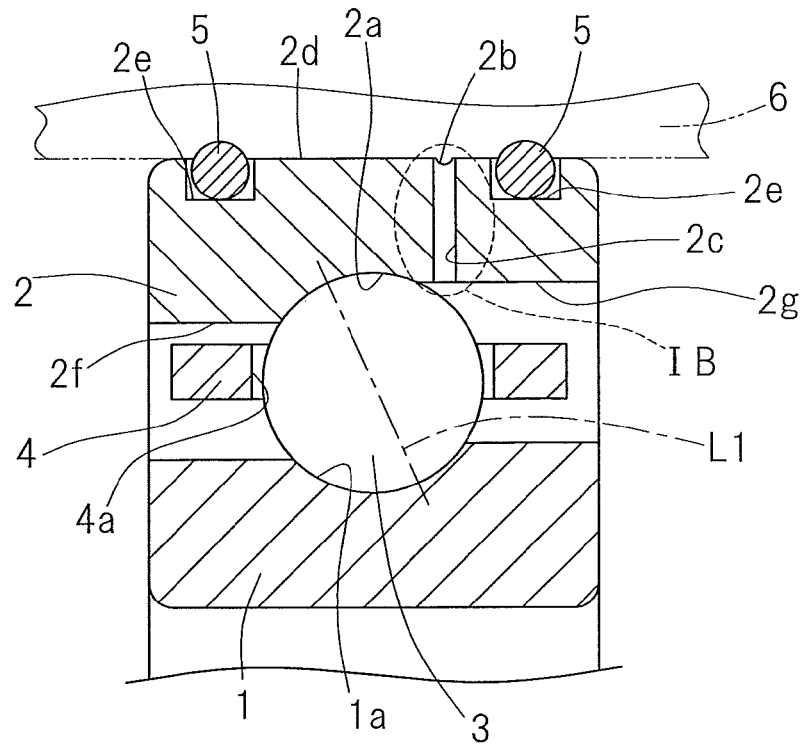
FIG. 1A is a longitudinal cross-sectional view of a rolling bearing according to a first embodiment of the present invention.

As shown in FIG. 1A, the rolling bearing according to the embodiment includes an inner ring 1, an outer ring 2, and a plurality of rolling elements 3 interposed between rolling surfaces 1a and 2a of these inner and outer rings 1 and 2. The rolling bearing of this example is an angular contact ball bearing, and the rolling elements 3 are composed of balls. Each rolling element 3 is retained within a pocket 4a of a ring-shaped retainer 4 so as to be spaced apart from each other at an equal interval in a circumferential direction. The roller retainer 4 is, for example, an outer ring guide type of being guided on an inner diameter surface 2f of the outer ring 2.

Figure 1B:
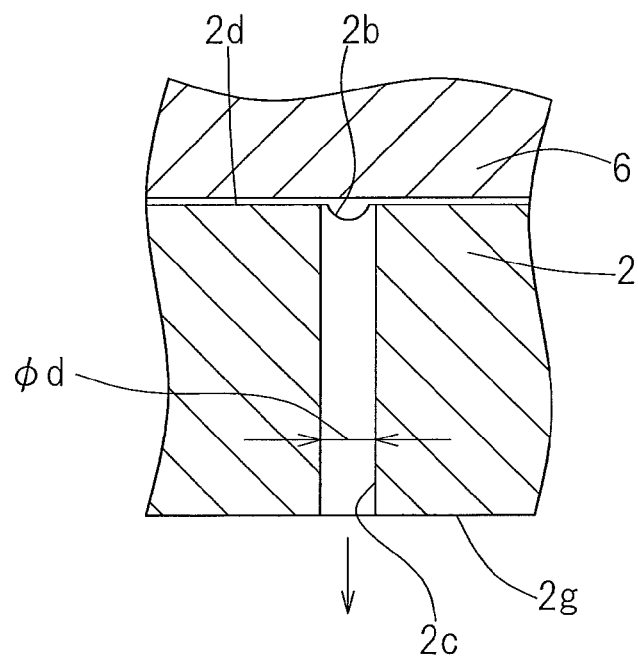
FIG. 1B is an enlarged cross-sectional view of a principal portion of the rolling bearing.
Figure 2:
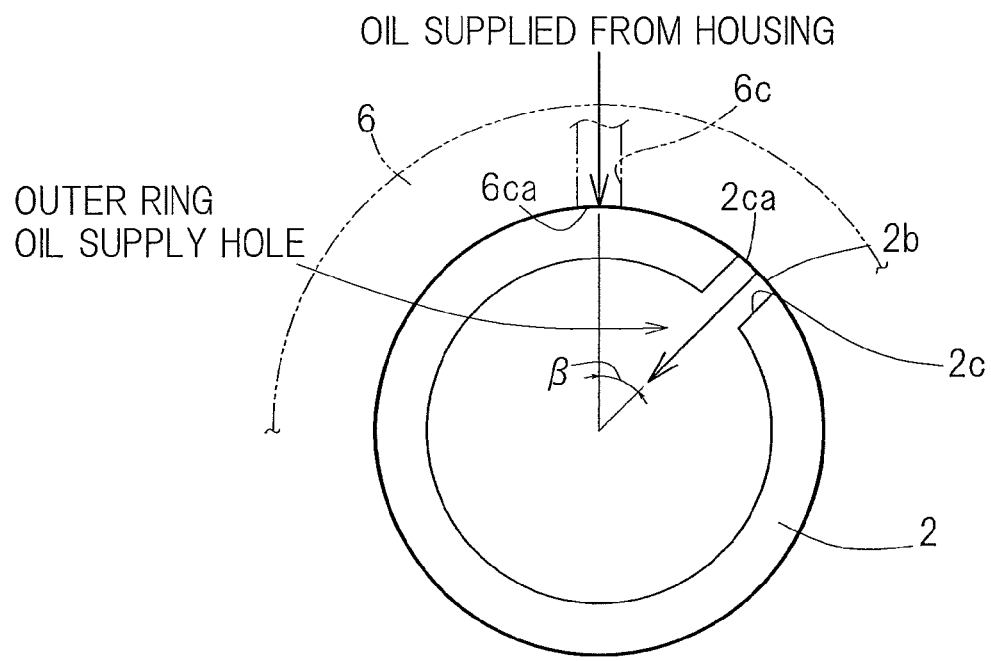
FIG. 2 is a schematic cross-sectional view of an outer ring of the rolling bearing, showing a phase difference between an oil supply hole of the outer ring and a lubricant oil introduction hole.

FIG. 1B is an enlarged view of an IB portion in FIG. 1A. As shown in FIG. 1B, a circumferential groove 2b, which is an circumferential flow passage, and an oil supply hole 2c are provided in the outer ring 2. The oil supply hole 2c is a hole for lubricant oil supply, which communicates between an outer diameter surface 2d of the outer ring 2 and a position, near the rolling surface, in an inner peripheral surface 2g of the outer ring 2. In the outer ring 2, the oil supply hole 2c is provided at one location on a side opposite to a side to which a line of action L1 that makes a contact angle with the rolling surface 2a is tilted, and extends through the outer ring 2 in a radial direction (FIG. 2). The diameter φd of the oil supply hole 2c is not less than 1.2 mm and not greater than 1.5 mm. The "position near the rolling surface" refers to a position in the inner peripheral surface 2g of the outer ring 2 on a side of non-contact between the rolling element 3 and the outer ring 2 with respect to the rolling element center, which position allows an entire lubricant oil discharged from the oil supply hole 2c to be applied to each rolling element 3.

As shown in FIG. 1B, the circumferential groove 2b is provided on the outer diameter surface 2d, which is a mounting surface of the outer ring 2 relative to a housing 6, so as to communicate with the oil supply hole 2c such that the lubricant oil from the outside of the bearing is introduced into the oil supply hole 2c. In other words, the circumferential groove 2b is provided so as to extend through a location in the outer diameter surface 2d of the outer ring 2, at which location an opening end of the oil supply hole 2c is present. The circumferential groove 2b serves to introduce the lubricant oil from the housing 6 into the oil supply hole 2c. Specifically, the circumferential groove 2b and an outer peripheral surface of the outer ring 2 cooperate together to form a circumferential flow passage.

As shown in FIG. 2, a lubricant oil introduction hole 6c is provided in the housing 6 and extends in the radial direction at a circumferential position different from that of the oil supply hole 2c. The circumferential positions of an outlet 6ca of the lubricant oil introduction hole 6c and an inlet 2ca of the oil supply hole 2c are shifted from each other by a determined angle β. The lubricant oil introduction hole 6c communicates with the oil supply hole 2c via the circumferential groove 2b.

As shown in FIG. 1B, a cross-sectional area E of the circumferential groove 2b obtained by viewing the circumferential groove 2b that is cut by a plane including a bearing axial direction is set so as to be not less than 0.4 mm$^2$ and not greater than 0.6 mm$^2$. The cross-sectional area E of the circumferential groove 2b is determined so as to be not less than 22% of and not greater than 53% of a cross-sectional area S of the oil supply hole 2c obtained by viewing the oil supply hole 2c that is cut by a plane perpendicular to a direction in which the oil supply hole 2c extends. When the oil supply hole 2c has a diameter ϕd, the cross-sectional area S of the oil supply hole 2c is calculated by multiplying the circular constant π by $(\phi d/2)^2$. The circumferential groove 2b is formed so as to have an arc-shaped cross section, and, for example, is located such that the position of a groove bottom of the circumferential groove 2b coincides with the central axis of the oil supply hole 2c.

As shown in FIG. 1A, annular grooves 2e are provided at positions on axial opposite sides of the circumferential groove 2b, respectively in the outer diameter surface 2d of the outer ring 2. An annular seal member 5, composed of an O-ring, is provided in each annular groove 2e. In other words, by providing the annular seal members 5 at the positions, between the inner peripheral surface of the housing 6 and the outer diameter surface 2d of the outer ring 2, on axial opposite sides of the circumferential groove 2b and the oil supply hole 2c, it is attempted to prevent leak of the lubricant oil.

Figure 3:
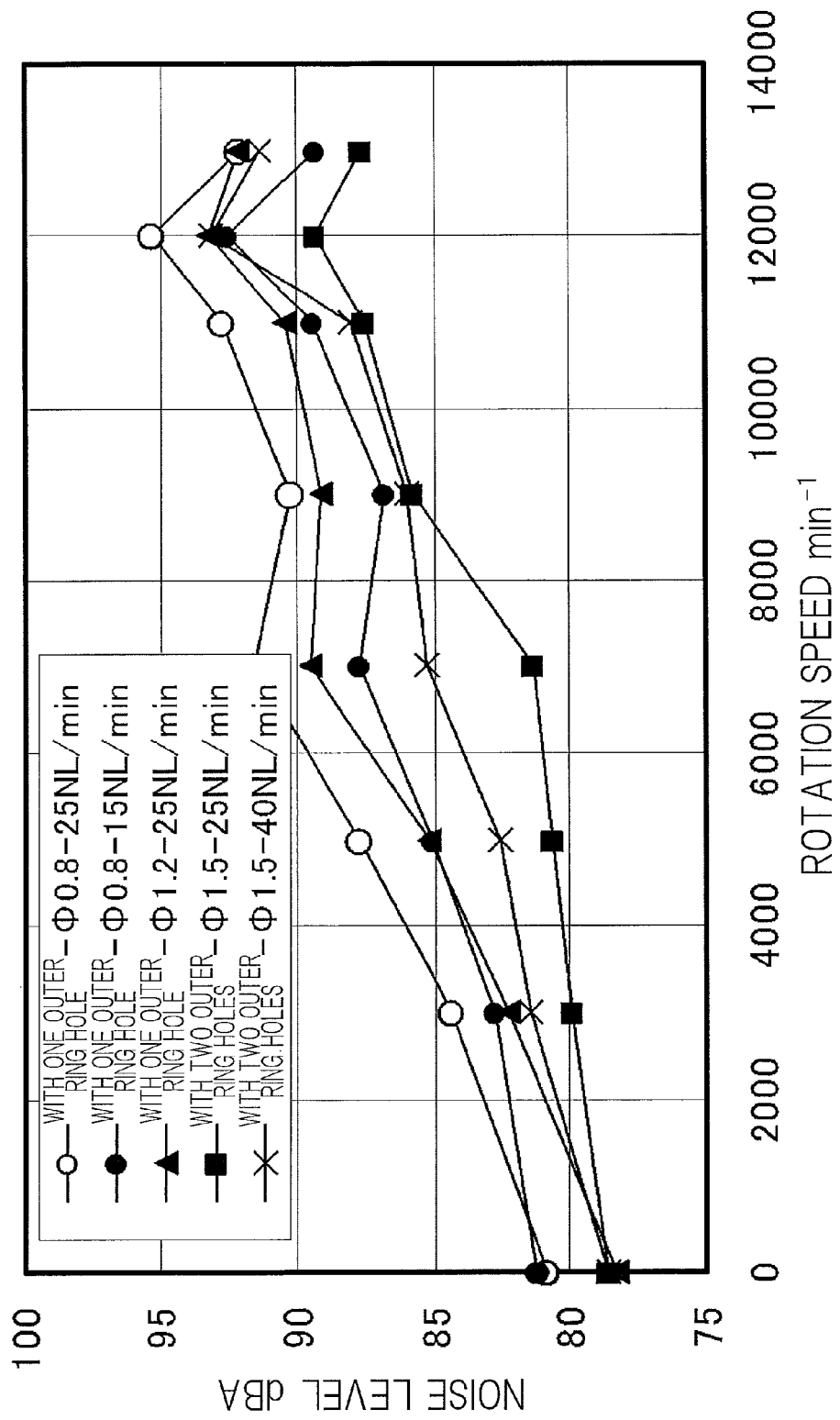
FIG. 3 is a characteristic diagram showing a relationship between a rotation speed and a noise level.
Figure 4:
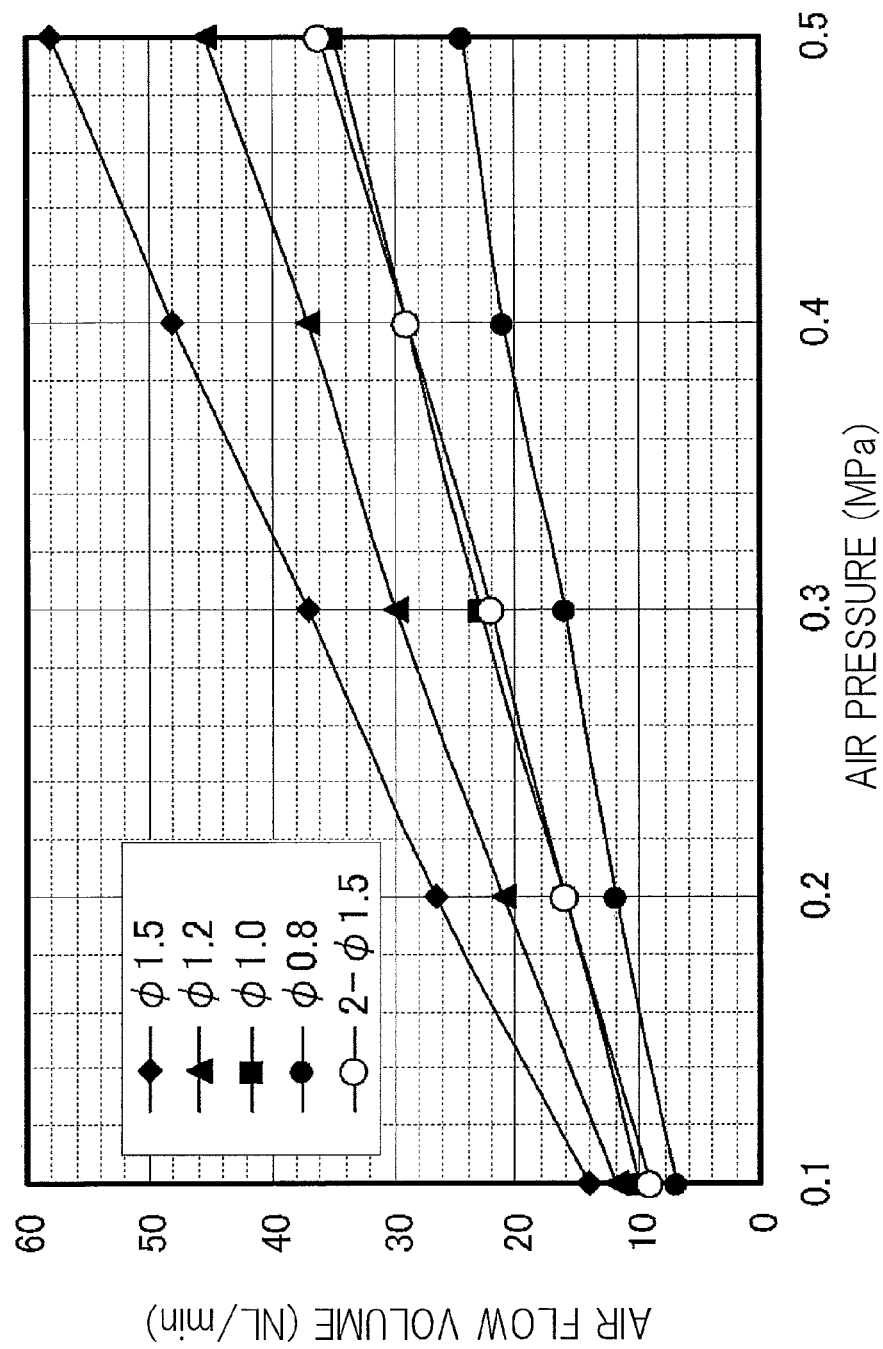
FIG. 4 is a characteristic diagram showing a relationship between an air pressure and an air flow volume.
Figure 5:
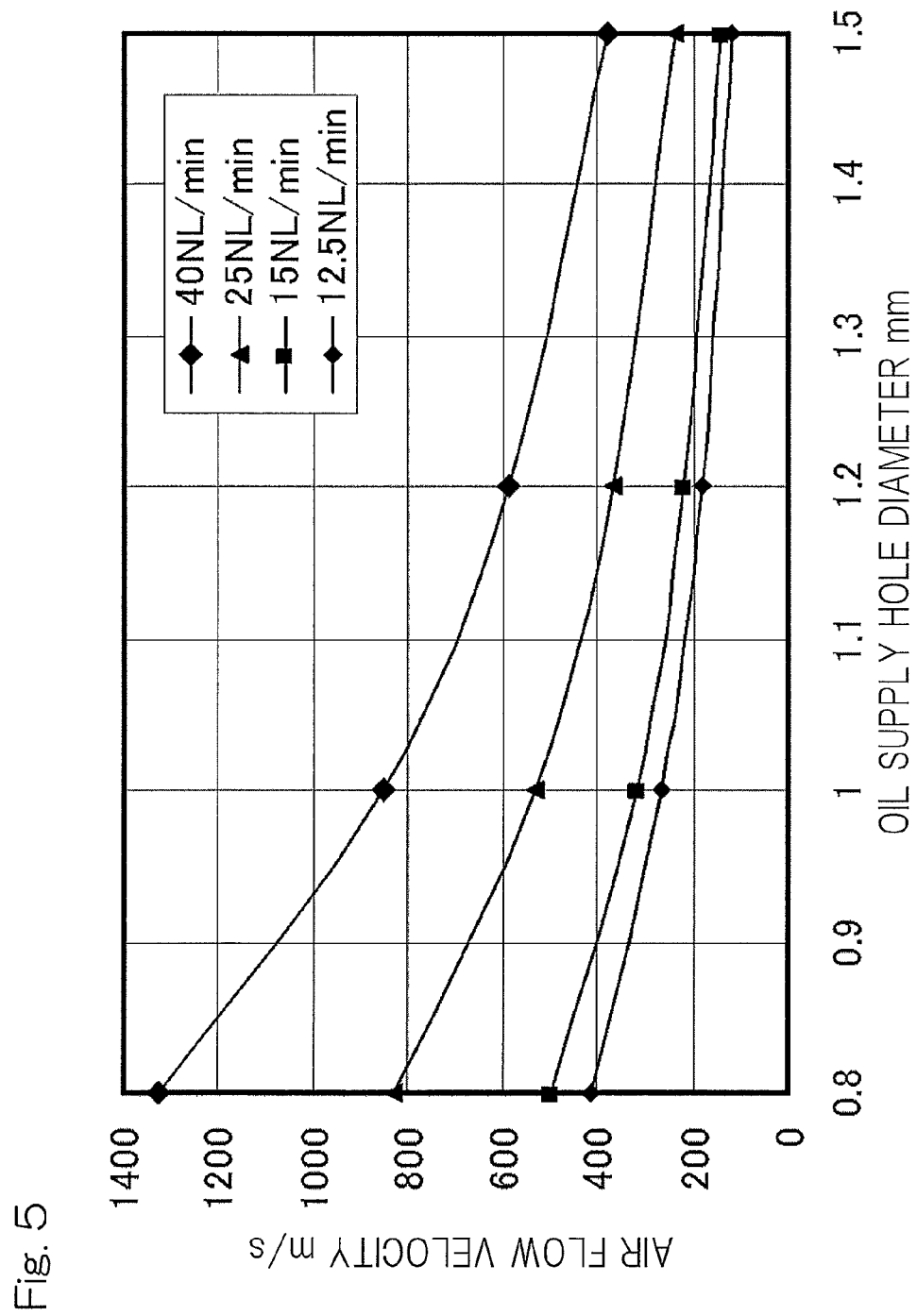
FIG. 5 is a characteristic diagram showing a relationship between the diameter of the oil supply hole and an air flow velocity.

FIG. 3 is a characteristic diagram showing a relationship between a rotation speed and a noise level. FIG. 4 is a characteristic diagram showing a relationship between an air pressure and an air flow volume. FIG. 5 is a characteristic diagram showing a relationship between the diameter of an oil supply hole and an air flow velocity. Under the conditions where one or two oil supply holes 2c of the outer ring 2 were provided and the diameter ϕd of each oil supply hole 2c and an air flow volume to the oil supply hole 2c were variously changed, a noise level with respect to a rotation speed was measured. As a result, as shown in FIG. 3, it is recognized that the noise level is the highest when the number of the oil supply holes is one, the diameter ϕd of the oil supply hole is 0.8 mm, and the air flow volume is 25 NL/min. On the other hand, the noise level is slightly decreased when the air flow volume is decreased to 15 NL/min; or the diameter ϕd of the oil supply hole is 1.2 mm and the air flow volume is 25 NL/min. This is thought to be because from FIGS. 4 and 5, the air flow velocity or the injection velocity of air is decreased from 800 m/s (an air pressure of 0.5 MPa) to about 500 m/s (an air pressure of 0.25 MPa) or to about 350 m/s (an air pressure of 0.25 MPa) in each case. However, even with such a decrease in the noise level, the noise is aurally determined to be still harsh.

In order to further decrease the noise level, it is only necessary to decrease the air flow velocity. For this, it is necessary to increase the diameter ϕd of the oil supply hole or to decrease the air pressure so as to decrease the air flow volume. However, in reality, it is appropriate that the diameter ϕd of the oil supply hole is about 1.2 mm to 1.5 mm at most. In addition, if the air flow volume is excessively decreased, a problem arises that an oil does not uniformly flow in a pipe composed of, for example, a nylon tube having a length of several meters and an inner diameter of about ϕ3 mm and extending from an air-oil lubrication unit (not shown) to the bearing.

Thus, in order to keep the air pressure at a certain level and in order to decrease the air flow velocity at the outlet of the oil supply hole, while the air flow volume is kept at about 20 NL/min at which oil flow in the pipe is not impaired, a specification has been suggested in which the diameter ϕd of the oil supply hole is increased to about 1.5 mm and the cross-sectional area E of the circumferential groove is limited to such a size that the cross-sectional area E becomes equivalent to that of the cross section of a hole of ϕ0.8 mm. When the diameter ϕd of the oil supply hole is set so as to be not less than 1.2 mm and not greater than 1.5 mm and the cross-sectional area E of the circumferential groove is set so as to be not less than 0.4 mm$^2$ and not greater than 0.6 mm$^2$, an effect is recognized that the air flow velocity is decreased without impairing oil flow in the pipe. When the bearing inner diameter is generally about ϕ30 mm to ϕ120 mm, the effect that the air flow velocity is decreased is obtained by setting the oil supply hole diameter ϕd and the cross-sectional area E of the circumferential groove to the above numerical values.

In general, the diameter of a hole, in an outer ring, for oil supply from a housing is about ϕ3 mm. However, in the rolling bearing according to the embodiment, a throttling effect is provided to the flow passage in a process of flowing via the circumferential groove of the outer ring, and the flow passage is enlarged again at the oil supply hole which is a final passage. The flow passage for air-oil is narrowed in the middle of the flow passage for lubricant oil, and therefore, unless a certain level of air pressure is applied, an air flow volume cannot be ensured. Thus, since a certain level of air pressure is applied, it is possible to avoid a problem that the oil flows less smoothly in the pipe due to insufficiency of an air flow volume. It should be noted that in general, the air pressure is not set to a low value and is frequently kept at about 0.2 to 0.5 MPa.

With the rolling bearing described above, the lubricant oil supplied from the outside of the bearing is supplied from the oil supply hole 2c to the position near the rolling surface within the bearing via the circumferential groove 2d of the outer ring 2 so as to lubricate the bearing. In other words, the lubricant oil supplied from the outside of the bearing is introduced to the oil supply hole 2c via the circumferential groove 2d, not directly to the oil supply hole. Thus, in a process where the lubricant oil flows via the circumferential groove 2d, by a throttling effect an air pressure is kept at a certain level (about 0.2 MPa or higher) such that the supplied air pressure is not excessively decreased. When the lubricant oil having a high supply air pressure flows into an oil supply hole, an air flow velocity thereof is decreased at an outlet of the oil supply hole. As a result, it is possible to reduce the noise level. When the bearing is rotated at a high speed, it is possible to reduce the noise level, and therefore, a working environment can be improved.

Since the annular grooves 2e are provided on the outer diameter surface 2d of the outer ring 2 and are arranged on the axial opposite sides of the circumferential groove 2b and the annular seal member 5 is provided in each annular groove 2e, the annular seal members 5 prevent the lubricant oil from undesirably leaking from the outer diameter surface 2d of the outer ring 2.

Since the diameter of the oil supply hole 2c is set so as to be not less than 1.2 mm and not greater than 1.5 mm and the cross-sectional area of the circumferential groove 2b obtained by viewing the circumferential groove 2b that is cut by the plane including the bearing axial direction is set so as to be not less than 0.4 mm² and not greater than 0.6 mm², the air flow volume can be kept such that oil flow in the pipe is not impaired, and at the same time, it is possible to decrease the air flow velocity at the outlet of the oil supply hole 2c. Thus, it is possible to reduce the noise level.

Figure 6:
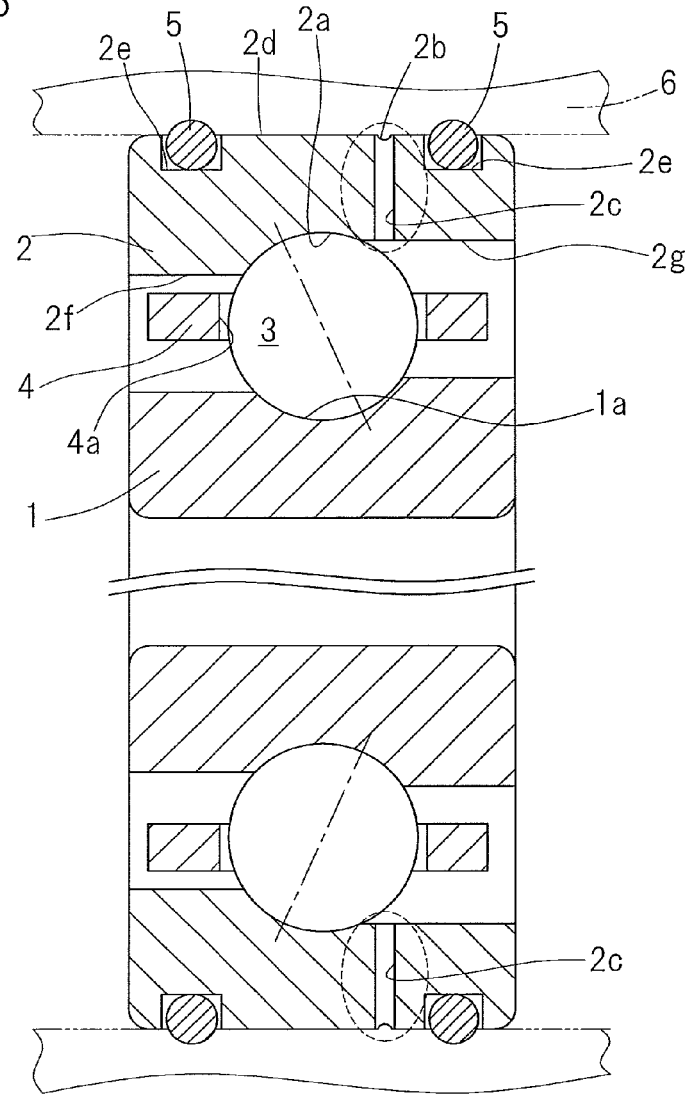
FIG. 6 is a longitudinal cross-sectional view of a rolling bearing according to a second embodiment of the present invention.
Figure 7:
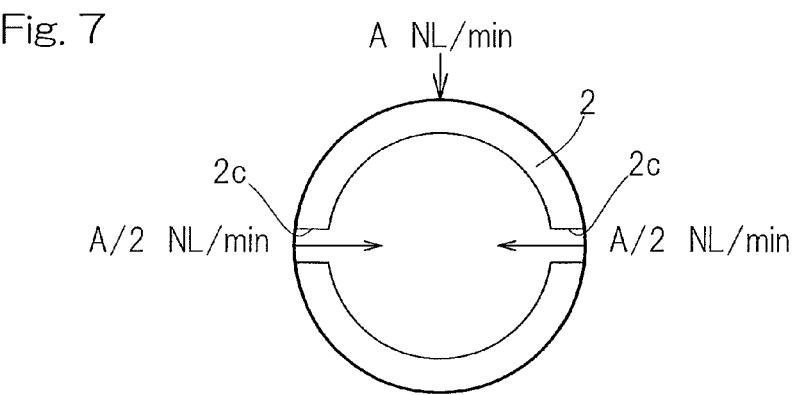
FIG. 7 is a schematic cross-sectional view of an outer ring of the rolling bearing, showing a phase difference between an oil supply hole of the outer ring and a lubricant oil introduction hole.

A second embodiment of the present invention will be described with reference to FIGS. 6 and 7. In the following description of the embodiment, portions corresponding to the matters described in the first embodiment are designated by the same reference numerals, and the overlap description thereof is omitted. It is also possible to partially combine the embodiments unless any problem is particularly posed due to the combination. As shown in FIGS. 6 and 7, in a rolling bearing according to the second embodiment, two oil supply holes 2c for lubricant oil supply are provided at 180-degree diagonal positions in the outer ring 2. The circumferential groove 2b provided on the outer diameter surface 2d of the outer ring 2 communicates with the two oil supply holes 2c.

In this case, as shown in FIG. 7, it is possible to decrease by half the air flow volume per one oil supply hole, and accordingly, it is possible to further decrease the air flow velocity. Thus, it is possible to further reduce the noise level. In addition, since the two oil supply holes 2c are provided at the 180-degree diagonal positions, the lubricant oil spreads in the circumferential direction via the circumferential groove 2b. Thus, it is possible to further enhance an effect of cooling the outer ring 2. It is also possible to provide the two oil supply holes 2c at a phase angle other than 180 degrees. Alternatively, three or more oil supply holes 2c may be provided.

Figure 8A:
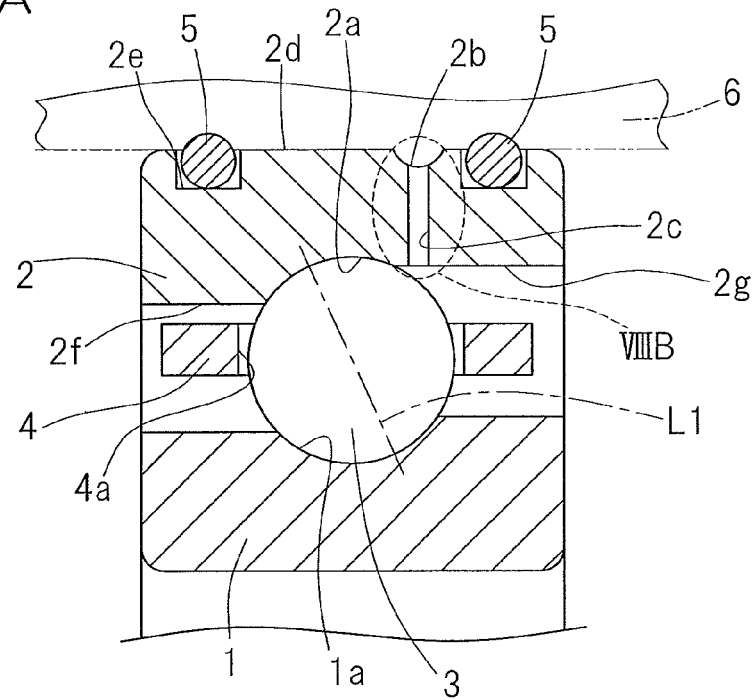
FIG. 8A is a longitudinal cross-sectional view of a rolling bearing according to a third embodiment of the present invention.
Figure 8B:
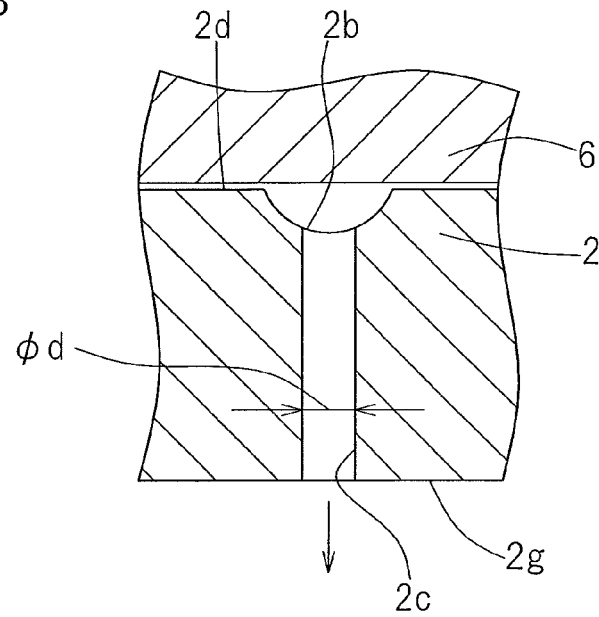
FIG. 8B is an enlarged cross-sectional view of a principal portion of the rolling bearing.

In a third embodiment shown in FIGS. 8A and 8B, the diameter φd of the oil supply hole 2c is set so as to be not less than 1.2 mm and not greater than 1.5 mm and the cross-sectional area E of the circumferential groove 2b obtained by viewing the circumferential groove 2b that is cut by the plane including the bearing axial direction is set so as to be not less than 0.6 mm². In this case, although there is the possibility that the oil flows less smoothly in the pipe than in each embodiment described above, it is possible to decrease the air flow velocity at the outlet of the oil supply hole 2c. Thus, it is possible to reduce the noise level. The rolling bearing may be a cylindrical roller bearing. In this case as well, since the lubricant oil from the outside of the bearing is introduced to the oil supply hole via the circumferential groove, not directly to the oil supply hole, the flow velocity of the lubricant oil is decreased by a throttling effect, and therefore, it is possible to reduce the noise level. As the lubrication system, an oil mist lubrication system may be used instead of the air-oil lubrication system.

Figure 9:
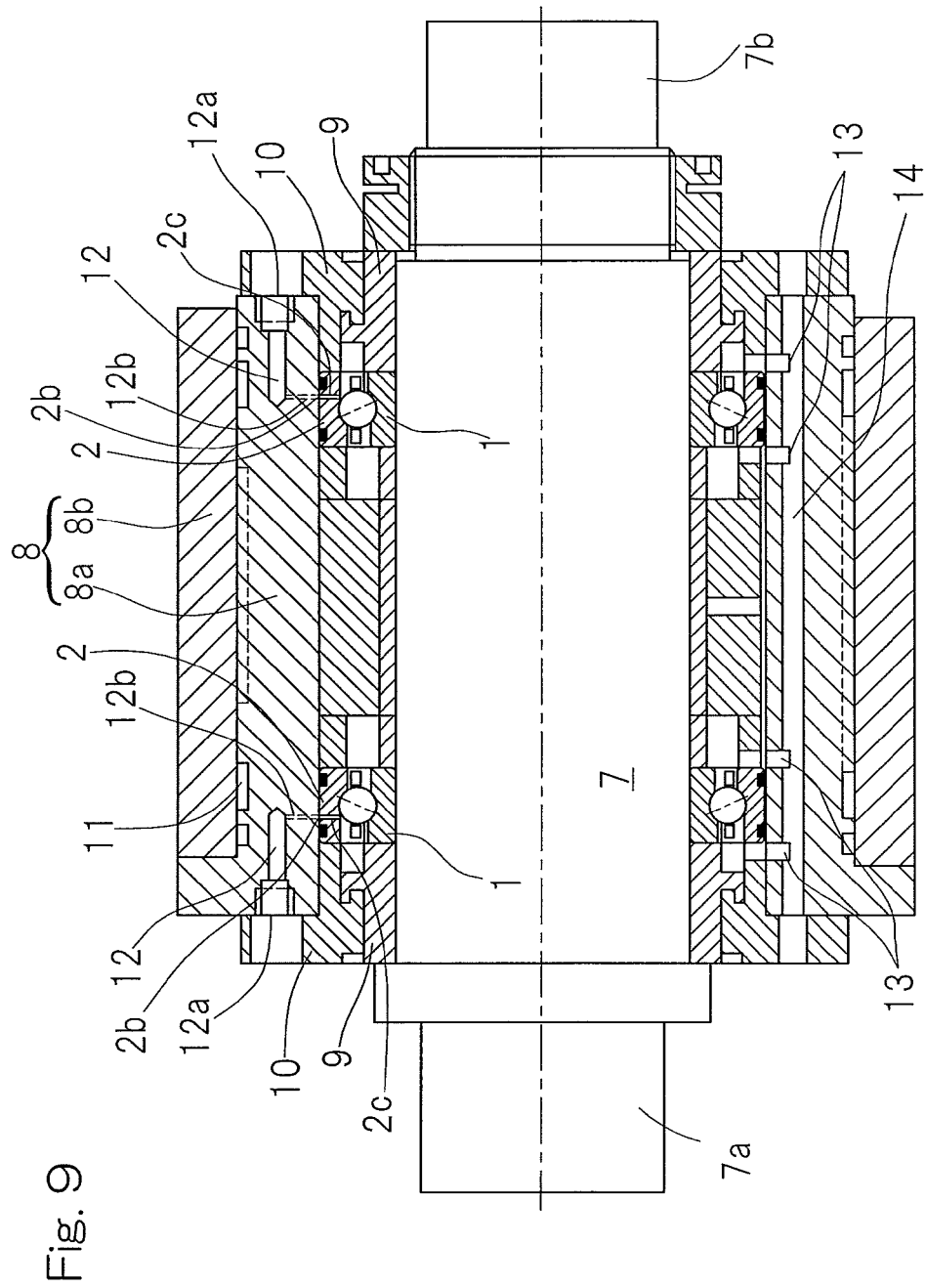
FIG. 9 is a longitudinal cross-sectional view of a main shaft device for a machine tool utilizing the rolling bearing assembly according to any of the embodiments.

A rolling bearing assembly which includes rolling bearings each comprised of any one of the angular contact ball bearings according to the first to third embodiments described above and a housing to which the outer rings of the rolling bearings are mounted, will be described with reference to FIGS. 9 and 10. FIG. 9 is a longitudinal cross-sectional view of a machine tool main shaft device utilizing the rolling bearing assembly. As shown in FIG. 9, a main shaft 7 has one end portion 7a to which a chuck for a work or tool (not shown) is fitted and the other end portion 7b to which a drive source such as a motor is connected via a rotation transmitting mechanism. The main shaft 7 is rotatably supported by a pair of rolling bearings which are spaced apart from each other in an axial direction. These rolling bearings are back-to-back arranged.

The inner ring 1 of each rolling bearing is mounted on an outer peripheral surface of the main shaft 7, and the outer ring 2 of each rolling bearing is mounted on an inner peripheral surface of a housing 8. The circumferential groove 2b (FIG. 1A) is provided on a mounting surface between the outer diameter surface of each outer ring 2 and the inner diameter surface of the housing 8 on which each outer ring 2 is mounted. The circumferential groove 2b communicates with the oil supply hole 2c and extends in a circumferential direction. These inner and outer rings 1 and 2 are fixed to the main shaft 7 and the housing 8 by an inner ring holding member 9 and an outer ring holding member 10, respectively. The housing 8 is configured to have a double structure composed of an inner housing 8a and an outer housing 8b, and a cooling medium flow passage 11 is formed between the inner housing 8a and the outer housing 8b. The inner housing 8a is provided with air-oil supply passages 12 having air-oil supply openings 12a. Each air-oil supply opening 12a is connected to an air-oil supply source (not shown). A lubricant oil introduction hole 12b of a downstream-side end of each air-oil supply passage 12 in the inner housing 8a and the oil supply hole 2c of each outer ring 2 are arranged such that the phases thereof in the circumferential direction are different from each other. In addition, the inner housing 8a is provided with air-oil discharge grooves 13 on the inner peripheral surface thereof and near the positions where the rolling bearings are provided, and also with an air-oil discharge passage 14 through which the air-oil discharge grooves 13 are opened to the atmosphere.

According to the machine tool main shaft device, an air-oil from each lubricant oil introduction hole 12b is introduced to the oil supply hole 2c via the circumferential groove 2b, not directly to the oil supply hole 2c. Thus, in a process where the air-oil flows via the circumferential groove 2b, by a throttling effect the air pressure is kept at a certain level (about 0.2 MPa or higher) such that the supplied air pressure is not excessively decreased. When the oil having such a high supply air pressure flows into the oil supply hole, the air flow velocity thereof is decreased at the outlet of the oil supply hole. As a result, it is possible to reduce the noise level.

Figure 10:
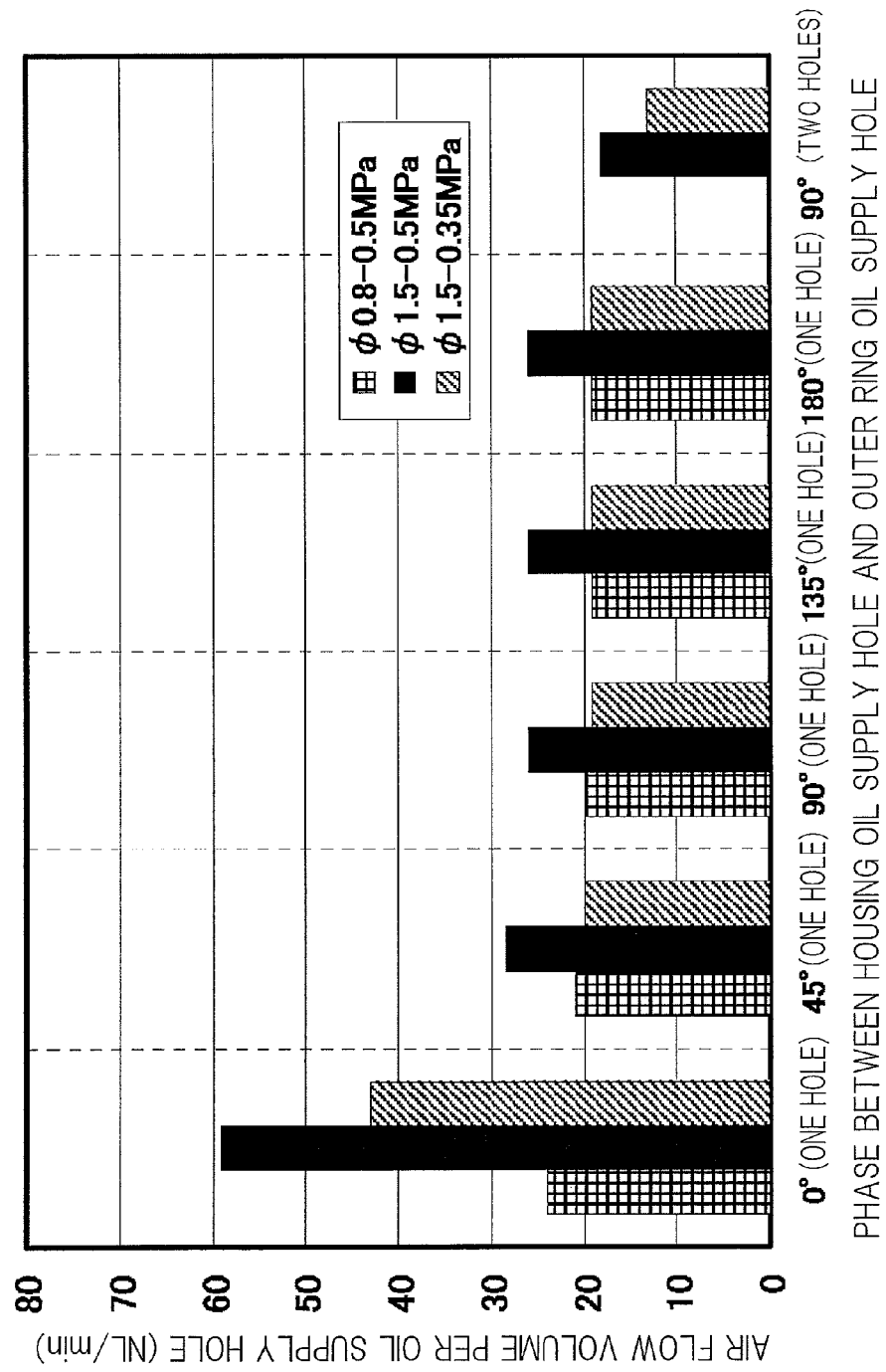
FIG. 10 is a characteristic diagram showing a relationship between an air flow volume and a phase between the lubricant oil introduction hole and the outer ring oil supply hole.

FIG. 10 is a characteristic diagram showing a relationship between an air flow volume and a phase between the lubricant oil introduction hole and the outer ring oil supply hole. At each phase, the air flow volume was measured in each of the cases where the diameter of the oil supply hole was φ0.8 mm and the air pressure was 0.5 MPa; the diameter of the oil supply hole was 0.5 mm and the air pressure was 0.5 MPa; and the diameter of the oil supply hole was φ1.5 mm and the air pressure was 0.35 MPa. As a result, when the phase between the lubricant oil introduction hole and the outer ring oil supply hole is 0°, no throttling effect of the circumferential groove having a decreased cross-sectional area is observed, but a throttling effect starts to appear when the phases are shifted from each other. In the case where one oil supply hole is provided in the outer ring, the air flow volume is not decreased further even when the phases are shifted from each other by 90° or higher. Thus, when two oil supply holes whose phases are different from that of the lubricant oil introduction hole by 90° are provided, it is possible to further decrease the air flow volume per one oil supply hole so as to decrease the air flow velocity, thereby further reducing the noise level.

Figure 11:
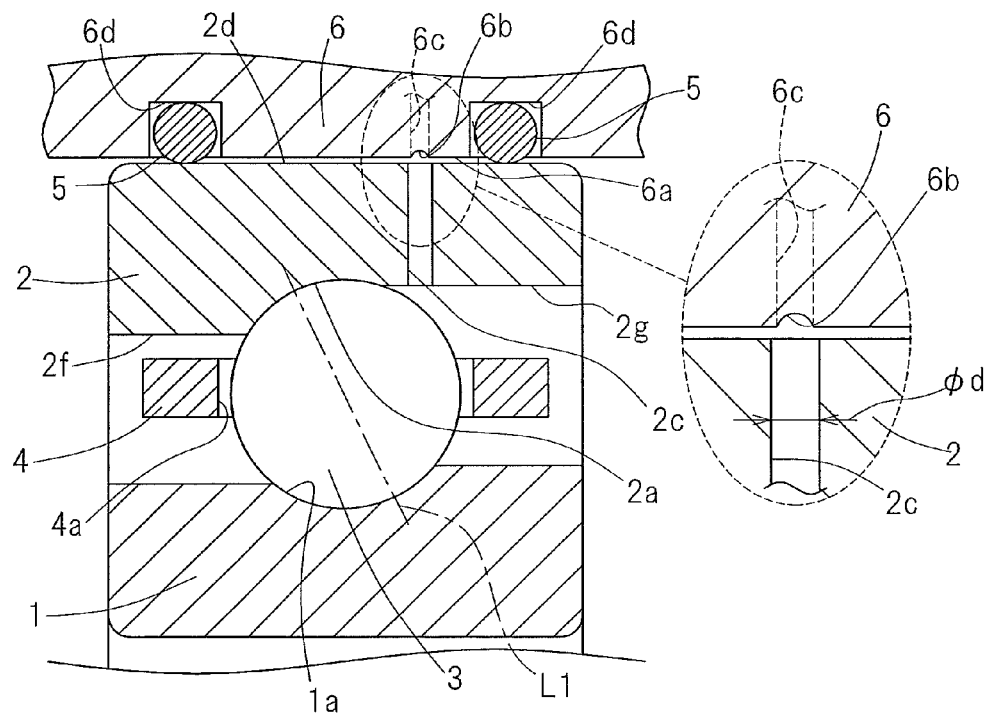
FIG. 11 is a longitudinal cross-sectional view of a rolling bearing assembly according to a fourth embodiment of the present invention.

Although the circumferential groove 2b, which is the circumferential flow passage, is provided on the outer diameter surface 2d of the outer ring 2 in each embodiment described above, a circumferential groove 6b may be provided as a circumferential flow passage on an inner diameter surface 6a of the housing 6 as shown in a fourth embodiment of FIG. 11. The circumferential groove 6b communicates with the oil supply hole 2c and extends in the circumferential direction. In addition, as described above, the lubricant oil introduction hole 6c of the housing 6 and the oil supply hole 2c of the outer ring 2 are provided at circumferential positions different from each other. In this case, one oil supply hole 2c may be provided in the outer ring 2 similarly to the first embodiment in FIG. 2, or two oil supply holes 2c may be provided in the outer ring 2 similarly to the second embodiment in FIG. 7. Furthermore, annular grooves 6d are provided on the inner diameter surface 6a of the housing 6 and at positions on opposite sides of the circumferential groove 6b, respectively. An annular seal member 5, composed of an O-ring, is provided in each annular groove 6d.

With the configuration in FIG. 11, the lubricant oil supplied from the lubricant oil introduction hole 6c of the housing 6 is supplied from the oil supply hole 2c to a position near the rolling surface within the bearing via the circumferential groove 6b of the housing 6 so as to lubricate the bearing. As described above, the lubricant oil from the lubricant oil introduction hole 6c is introduced to the oil supply hole 2c via the circumferential groove 2b, not directly to the oil supply hole 2c. Thus, in a process where the lubricant oil flows via the circumferential groove 2b, by a throttling effect the air pressure is kept at a certain level (about 0.2 MPa or higher) such that the supplied air pressure is not excessively decreased. When the lubricant oil having such a sufficient air pressure flows into the oil supply hole, the air flow velocity is decreased at the outlet of the oil supply hole. As a result, it is possible to reduce the noise level. Therefore, when the bearing is rotated at a high speed, it is possible to reduce the noise level, and thus, the working environment can be improved.

Figure 12:
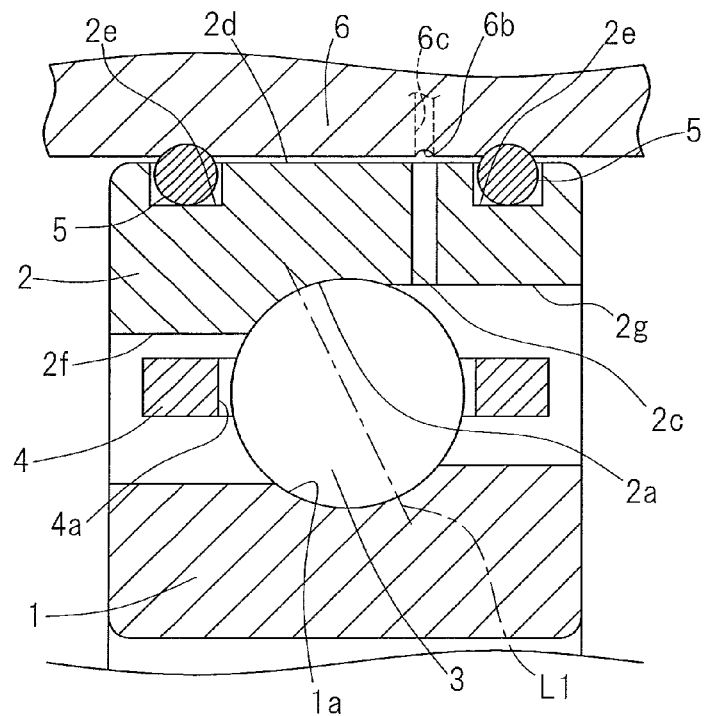
FIG. 12 is a longitudinal cross-sectional view of a rolling bearing assembly according to a fifth embodiment of the present invention.

As shown in a fifth embodiment in FIG. 12, the circumferential groove 6b may be provided on the inner diameter surface 6a of the housing 6, the annular grooves 2e may be provided on the outer diameter surface 2d of the outer ring 2 and at positions on opposite sides of the circumferential groove 2b, respectively, and the annular seal member 5 composed of an O-ring may be provided in each annular groove 2e.

Figure 13:
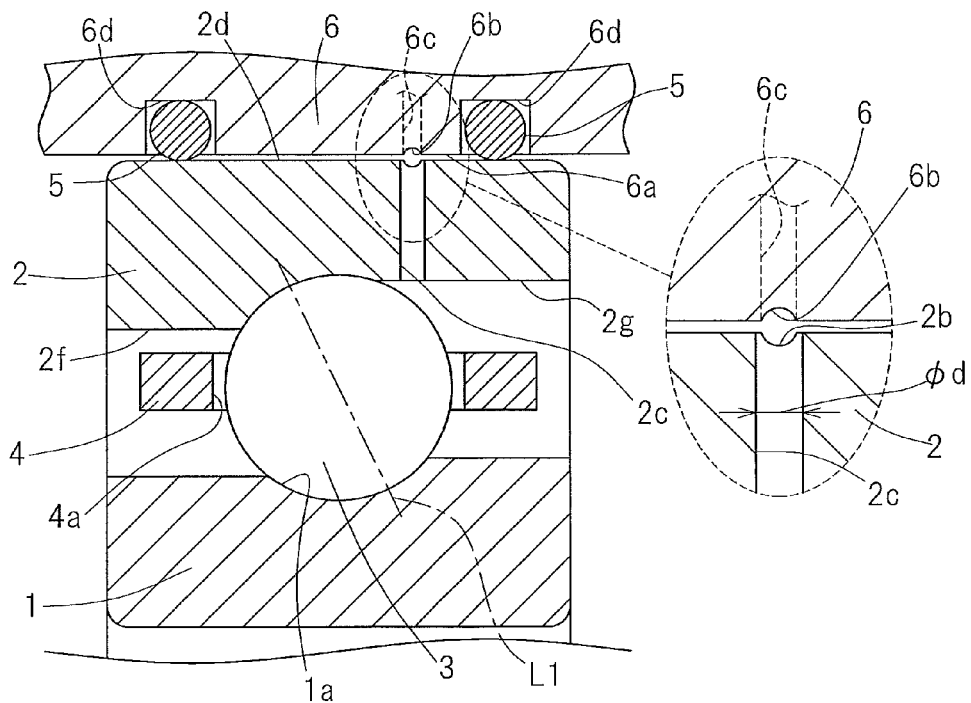
FIG. 13 is a longitudinal cross-sectional view of a rolling bearing assembly according to a sixth embodiment of the present invention.

As shown in a sixth embodiment in FIG. 13, the circumferential groove 2b may be provided on the outer diameter surface 2d of the outer ring 2, and the circumferential groove 6b may be provided on the inner diameter surface 6a of the housing 6.

Figure 14:
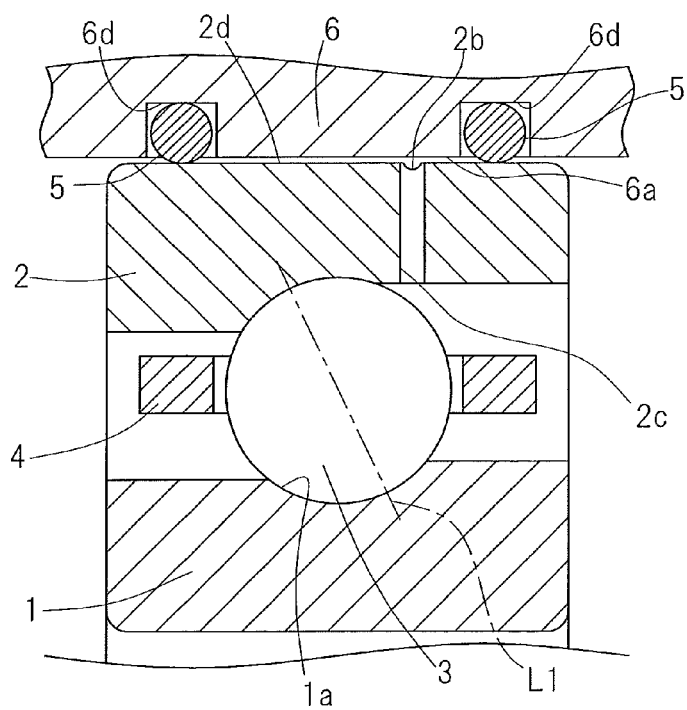
FIG. 14 is a longitudinal cross-sectional view of a rolling bearing assembly according to a seventh embodiment of the present invention.
Figure 15:
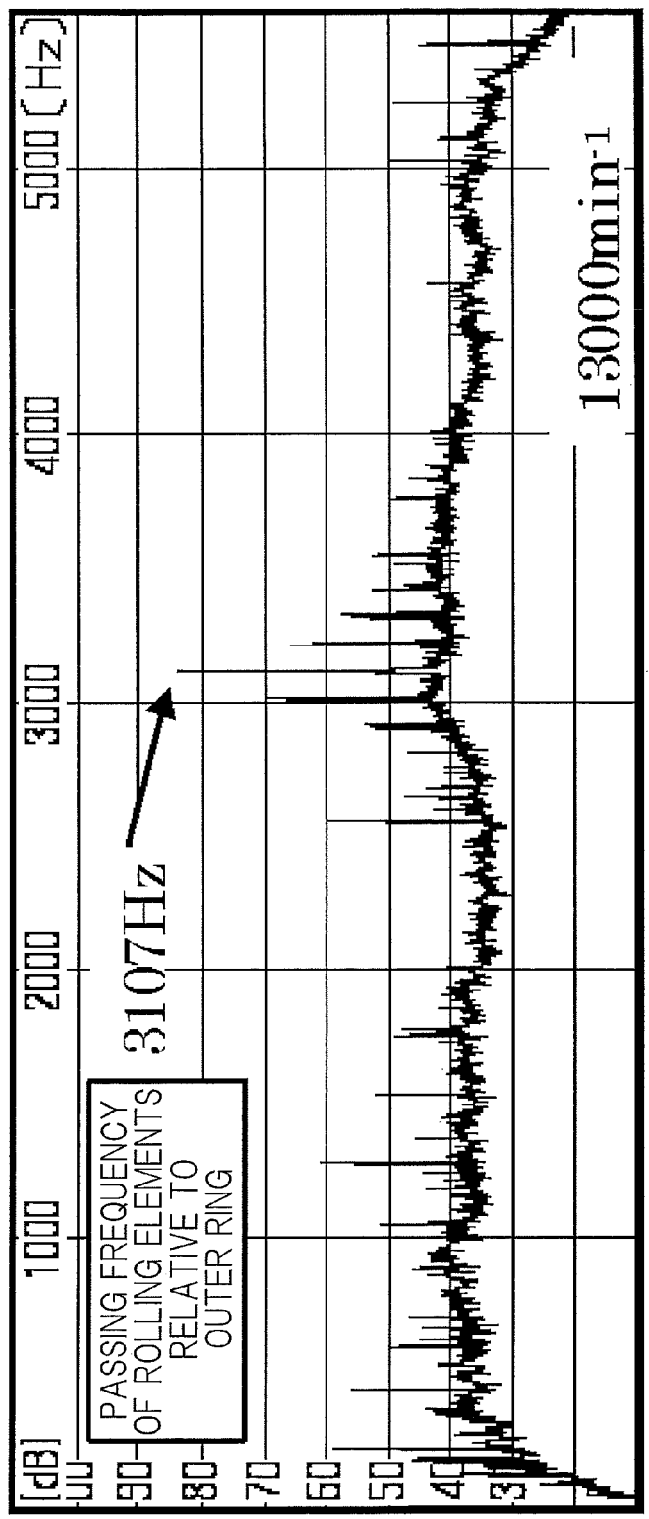
FIG. 15 is a characteristic diagram showing a frequency analysis result of a bearing at 13000 $min^{-1}$.

As shown in a seventh embodiment in FIG. 14, the circumferential groove 2b may be provided on the outer diameter surface 2d of the outer ring 2, the annular grooves 6d may be provided on the inner diameter surface 6a of the housing 6, and the annular seal member 5 may be provided in each annular groove 6d.

Even with these configurations, in the process where the lubricant oil flows via the circumferential groove, by the throttling effect the supplied air pressure is increased, and the air flow velocity is decreased at the outlet of the oil supply hole, whereby to reduce the noise level.

Meanwhile, in the case of the angular contact ball bearing in the air-oil lubrication system in which the lubricant oil is supplied in the form of air-oil, after the bearing is mounted on the main shaft, the air flow volume and the oil volume are adjusted to specified setting values, and then a test operation is conducted. With regard to the adjustment of the air flow volume, the air flow volume is measured with a flowmeter that is provided on a pipe extending from an air-oil lubrication unit (not shown) to the bearing having the oil supply hole provided in the outer ring. For example, when it is desired to set the air flow volume to 30 NL/min, adjustment is performed with an adjustment screw or the like of the air-oil lubrication unit such that the flowmeter indicates 30 NL/min. It is assumed that the supplied air pressure at that time is, for example, 0.3 MPa.

Figure 20:
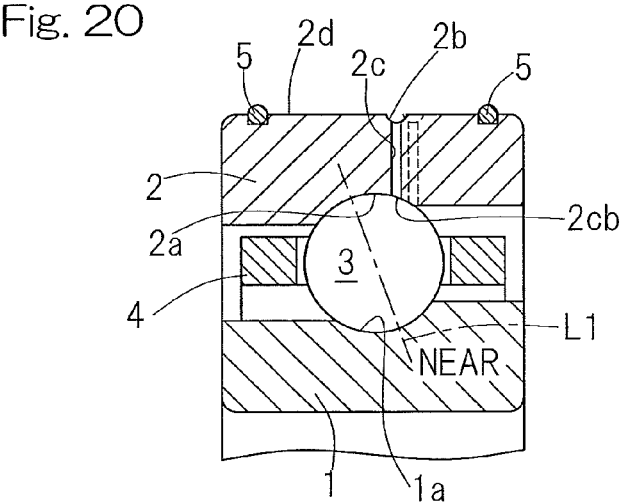
FIG. 20 is a longitudinal cross-sectional view of a rolling bearing, showing an example of the position of an oil supply hole of an outer ring.

FIG. 20 is a longitudinal cross-sectional view of a rolling bearing, showing an example of the position of the oil supply hole of the outer ring 2.

Figure 21:
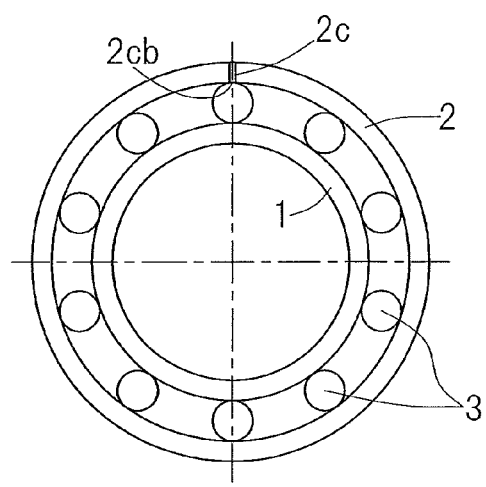
FIG. 21 is a plan view of a rolling bearing according to a proposed reference example.

This rolling bearing is an angular contact ball bearing, and the oil supply hole 2c of the outer ring 2 is provided at an axial position closer to the center of the rolling element than that in each embodiment described above. The oil supply hole 2c is formed so as to extend along the bearing radial direction from the outer diameter surface 2d of the outer ring 2 to a portion, on a non-contact side, of the rolling surface 2a of the outer ring 2. Thus, an outlet 2cd of the oil supply hole 2c is provided at a position in the outer ring 2, where the lubricant oil can be supplied from the outer ring 2 directly to each rolling element 3. The "non-contact side" refers to a side in the outer ring 2, which is opposite to a side to which a line of action LI that makes a contact angle with the rolling surface 2a is tilted. FIG. 21 is a plan view of a rolling bearing according to a proposed reference example. This rolling bearing has the outer ring 2 provided with one oil supply hole 2c.

In the rolling bearing in FIG. 20 or 21, when the circumferential position of any one of the rolling elements 3 coincides with that of the oil supply hole 2c during bearing operation, the oil supply hole 2c may be blocked by the rolling element 3, resulting in being difficult to come out from the outlet 2cb of the oil supply hole 2c. When the circumferential positions of the oil supply hole 2c and the rolling element 3 coincide with each other, there is the possibility that the air flow volume, which has been adjusted to 30 NL/min (the air pressure is fixed at 0.3 MPa), reaches only 10 NL/min. On the other hand, there is also a possibility that the air volume happens to be adjusted to 30 NL/min in a state where the circumferential positions of the oil supply hole 2c and the rolling element 3 coincide with each other, and that the air flow volume is then increased to 50 NL/min as soon as the phases of them are shifted from each other.

Figure 22:
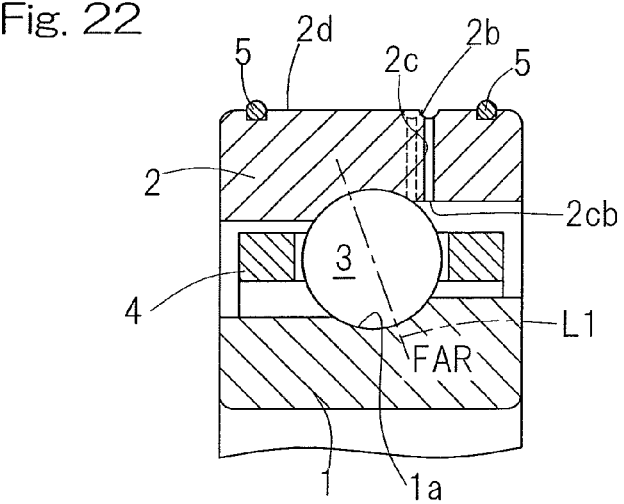
FIG. 22 is a longitudinal cross-sectional view of the rolling bearing, showing an example of the position of an oil supply hole of an outer ring.
Figure 23:
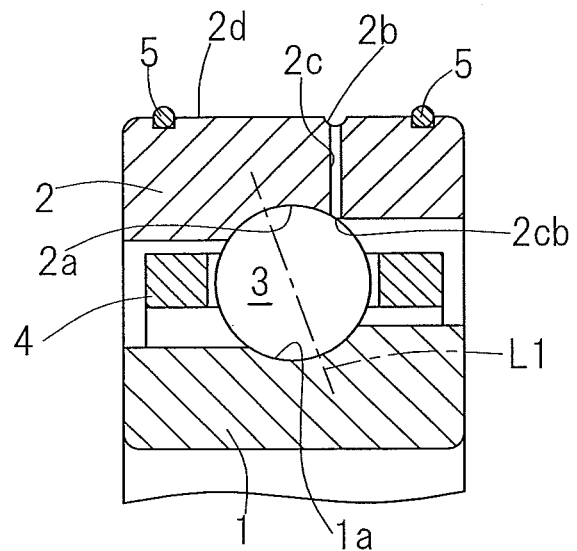
FIG. 23 is a longitudinal cross-sectional view of the rolling bearing, showing another example of the position of the oil supply hole of the outer ring.

FIG. 22 is a longitudinal cross-sectional view of a rolling bearing, showing another example of the position of the oil supply hole of the outer ring 2. This rolling bearing is an angular contact ball bearing, and the oil supply hole 2c of the outer ring 2 is provided so as to be distanced from that in FIG. 20 toward the outer ring end face side. In this example, the oil supply hole 2c is not blocked by any rolling element 3, but the distance between the outlet 2cb of the oil supply hole 2c and each rolling element 3 is increased. If such a distance is increased, it is difficult for the oil carried by air to reach each rolling element 3, due to the effect of air curtain by each rolling element 3 during bearing rotation. Thus, it is necessary to increase the air flow volume, and as a result, the noise level is increased due to wind noise of air by each rolling element 3. Therefore, for the position of the oil supply hole 2c in a cross section of the bearing obtained by viewing the bearing that is cut by a plane including the bearing axis, it is thought that there is an applicable range, while a position shown in FIG. 23 is the optimum position.

Figure 16A:
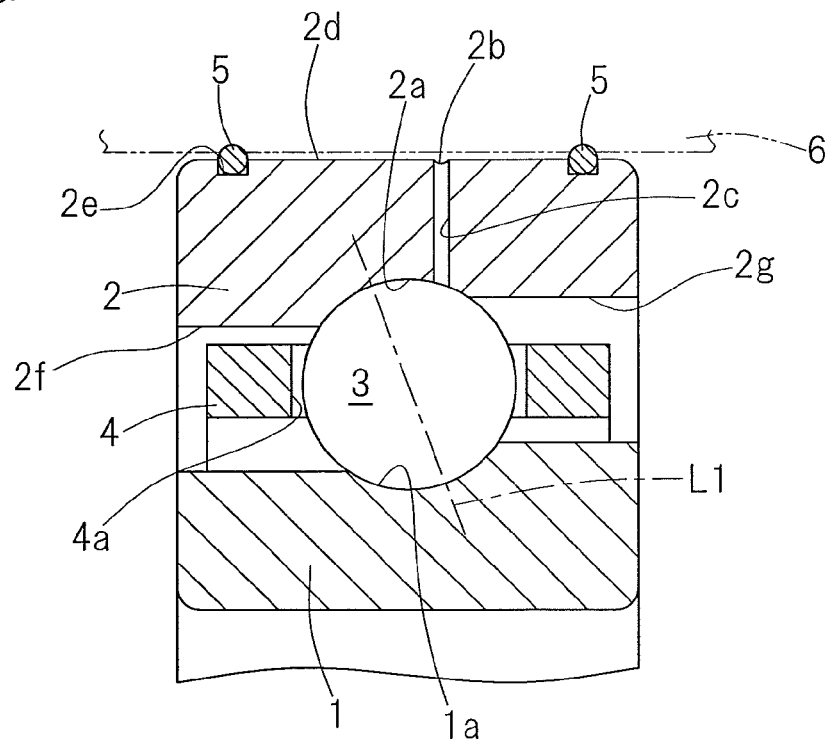
FIG. 16A is a longitudinal cross-sectional view of a rolling bearing according to an eighth embodiment.
Figure 16B:
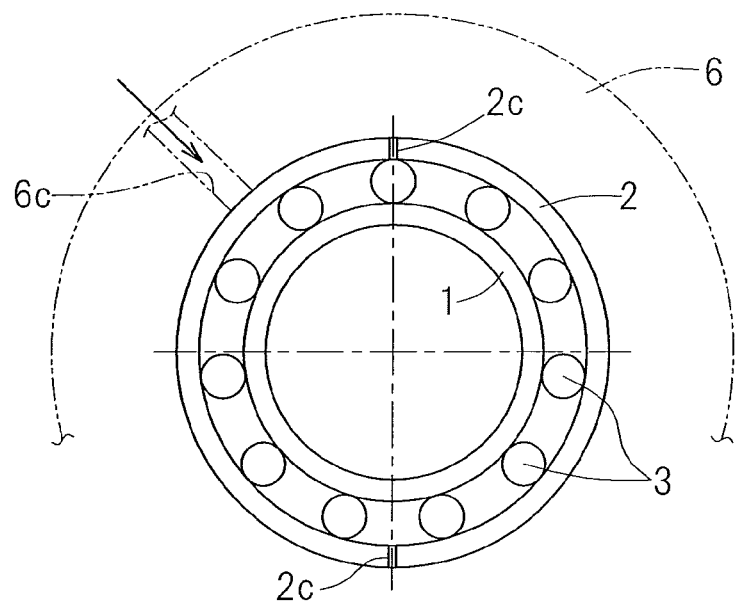
FIG. 16B is a plan view of the rolling bearing.

FIG. 16A is a longitudinal cross-sectional view of a rolling bearing according to an eighth embodiment, and FIG. 16B is a plan view of the rolling bearing. As shown in FIG. 16A, the oil supply hole 2c is formed so as to extend along the bearing radial direction from the outer diameter surface 2d of the outer ring 2 to the portion, on the non-contact side, of the rolling surface 2a of the outer ring 2. In addition, an outlet of the oil supply hole 2c is provided at a position, in the outer ring 2, where the lubricant oil can be supplied from the outer ring 2 directly to each rolling element 3. Furthermore, as shown in FIG. 16B, the number of the rolling elements 3 is an odd number (11 in this example), and two oil supply holes 2c are provided at 180-degree diagonal positions, respectively, in the outer ring 2.

With this configuration, the lubricant oil supplied from the lubricant oil introduction hole 6c of the housing 6 is introduced to the two oil supply holes 2c of the outer ring 2 via the circumferential groove 2b, which is the circumferential flow passage. In this case, the number of the rolling elements 3 is an odd number and the two oil supply holes 2c are provided at the 180-degree diagonal positions in the outer ring 2, respectively, and therefore, even when one rolling element 3 blocks one of the oil supply holes 2c, the other oil supply hole 2c is not blocked by any rolling element 3. The odd number of the rolling elements 3 are arranged at equal intervals in the circumferential direction. Thus, when the one of the oil supply holes 2c is blocked by one rolling element 3, the other oil supply hole 2c, which is located at the 180-degree diagonal position, is positioned between the rolling elements 3 adjacent to each other in the circumferential direction. Therefore, the lubricant oil supplied from the housing 6 passes through either oil supply hole 2c that is not blocked by any rolling element 3, and hence, no air flow fluctuation occurs. Accordingly, even when the air flow volume is not increased, it is possible to prevent the lubricant oil from becoming difficult to reach each rolling element 3. Thus, it is possible to reduce the noise level caused by increasing the air flow volume.

Figure 24:
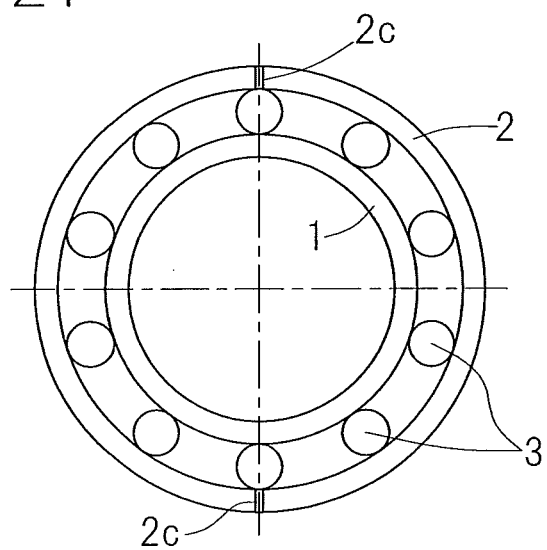
FIG. 24 is a plan view of a rolling bearing according to a proposed reference example.

However, even when the two oil supply holes 2c are provided at the 180-degree diagonal positions, if the number of the rolling elements is an even number as shown in FIG. 24, both oil supply holes 2c may be blocked by the rolling elements 3, and thus air flow fluctuation may occur.

As shown in FIG. 16A, since the oil supply hole 2c communicates between the outer diameter surface 2d of the outer ring 2 and the rolling surface 2a of the outer ring 2, the lubricant oil can be reliably supplied to each rolling element 3 without influence of air curtain by each rolling element 3 during bearing operation. In addition, when two oil supply holes 2c are provided at 180-degree diagonal positions in the outer ring 2 as shown in FIG. 16B, it is possible to uniformly cool the entire bearing.

Figure 17A:
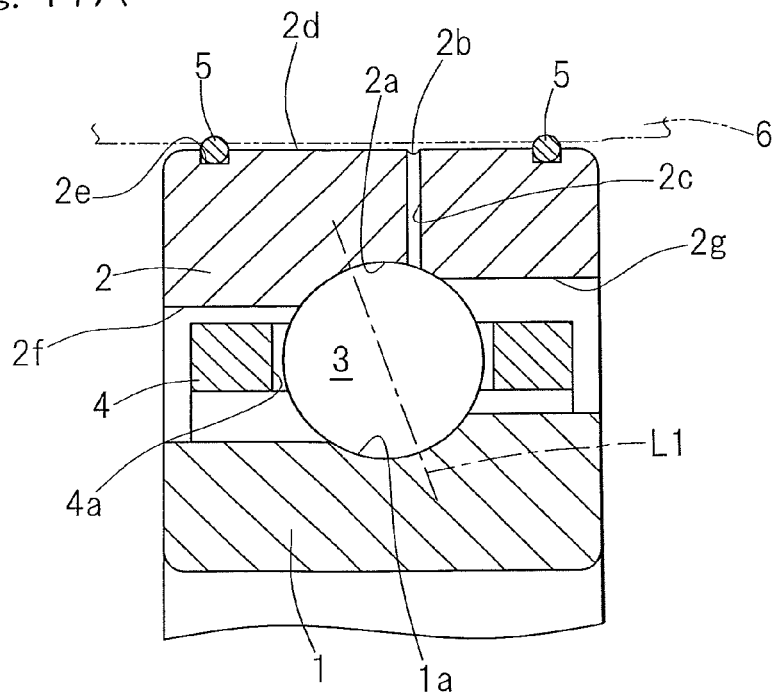
FIG. 17A is a longitudinal cross-sectional view of a rolling bearing according to a ninth embodiment.
Figure 17B:
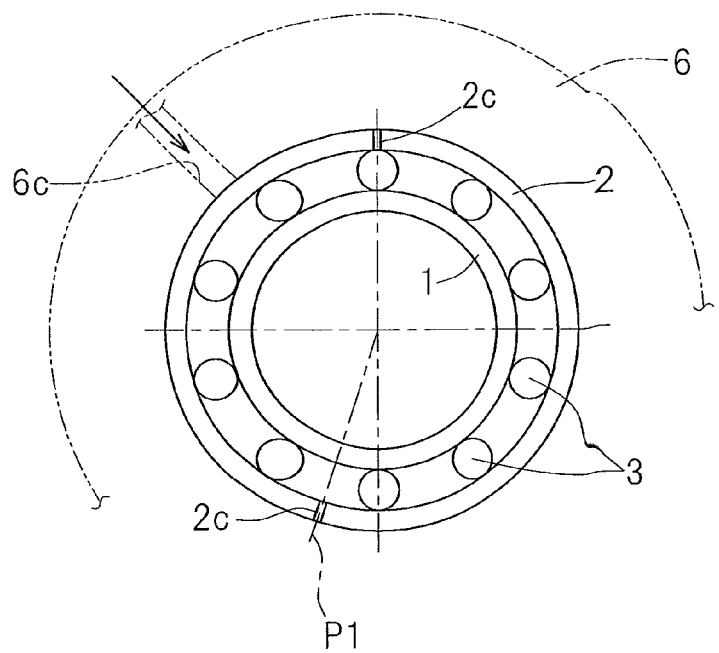
FIG. 17B is a plan view of the rolling bearing.

FIG. 17A is a longitudinal cross-sectional view of a rolling bearing according to a ninth embodiment, and FIG. 17B is a plan view of the rolling bearing. A cross-sectional structure of the rolling bearing in FIG. 17A is the same as that in FIG. 16A.

As shown in FIG. 17B, the number of the rolling elements 3 is an even number (10 in this example), and two oil supply holes 2c are provided in the outer ring 2 such that when the circumferential position of any one of the rolling elements 3 coincides with that of one of the oil supply holes 2c, the other oil supply hole 2c is located at an outer ring circumferential position P1 between a first rolling element 3 near a 180-degree diagonal position with respect to the one of the oil supply holes 2c and a second rolling element 3 adjacent to the first rolling element 3.

As described above, even when the number of the rolling elements 3 is an even number, since the other oil supply hole 2c is located at the outer ring circumferential position P1 between the rolling element 3 near the 180-degree diagonal position relative to the one of the oil supply holes 2c and the rolling element 3 adjacent to this rolling element 3, both oil supply holes 2c are not simultaneously blocked by any rolling elements 3. Therefore, the lubricant oil supplied from the housing 6 passes through either oil supply hole 2c that is not blocked by any rolling element 3, and hence, no air flow fluctuation occurs. Thus, even when the air flow volume is not increased, it is possible to prevent the lubricant oil from becoming difficult to reach each rolling element 3. As a result, it is possible to reduce the noise level caused by increasing the air flow volume. Since each oil supply hole 2c communicates between the outer diameter surface 2d of the outer ring 2 and the rolling surface 2a of the outer ring 2, the lubricant oil can be reliably supplied to each rolling element 3 without influence of air curtain by each rolling element 3 during bearing operation.

Figure 18:
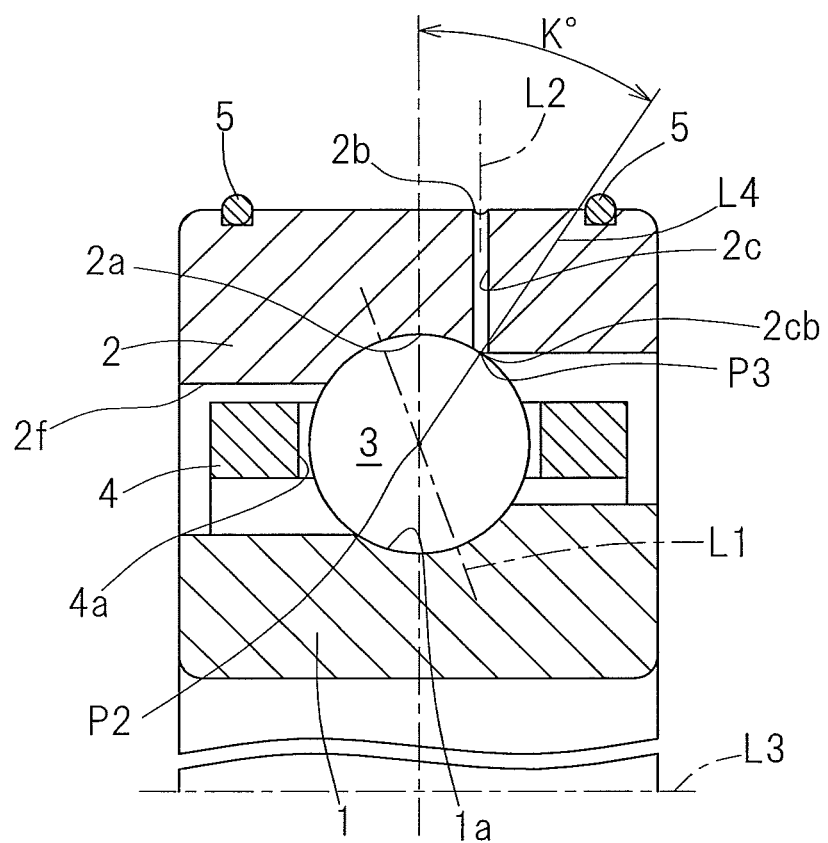
FIG. 18 is a longitudinal cross-sectional view of a rolling bearing according to a tenth embodiment.

In a rolling bearing according to a tenth embodiment shown in FIG. 18, with the configuration of the rolling element number and the oil supply hole arrangement in the eighth embodiment shown in FIG. 16B or in the ninth embodiment shown in FIG. 17B, the outlet 2cb of the oil supply hole 2c is provided in the outer ring 2 and at a position where the lubricant oil can be supplied directly to each rolling element 3. As shown in FIG. 18, the oil supply hole 2c in the rolling bearing is located at such a position that when the center P2 of the rolling element 3 is located at a circumferential position that is the same as that of the center line L2 of the oil supply hole 2c, an angle K formed between the bearing radial direction or bearing radial line and a straight line L4 connecting the center P2 of the rolling element 3 to an intersection point P3 between the center line L2 of the oil supply hole 2c and the outer diameter surface of the rolling element 3, in a plane including the center P2 of the rolling element 3 and the bearing axis L3, is in a range of not less than 10° and not greater than 30°.

Figure 19:
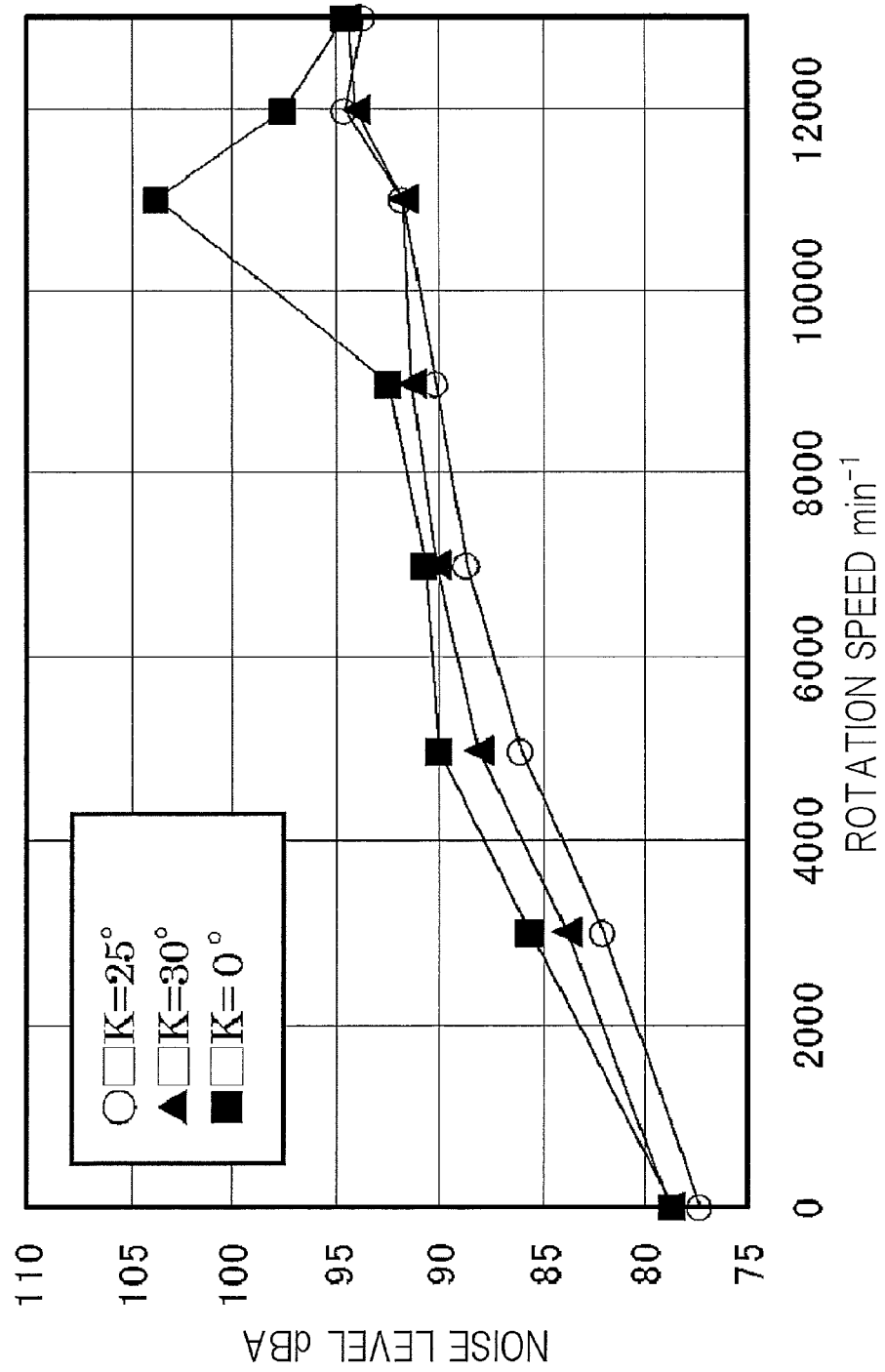
FIG. 19 is a characteristic diagram showing a relationship between a rotation speed and a noise level.

There were prepared angular contact ball bearings of a model number (specifically, test model number: 5S-2LA-HSE020P4 (bearing inner diameter: φ100 mm), tested with 31 balls) having two oil supply holes of 180-degree opposite arrangement and an odd number of rolling elements in which the angle K was variously changed (in this example, K=0°, 25°, 30° and a test was conducted for examining a relationship between a rotation speed and a noise level. As a result, the results shown in FIG. 19 were obtained. When the oil supply hole is located at such a position that the angle K is in the range of not less than 10° and not greater than 30°, it is possible to reduce the noise level during bearing operation more than in the case where the oil supply hole is located at such a position that the angle K is out of the above range. When the angle K is 0°, a phenomenon was observed that the noise level was rapidly increased at a certain rotation speed during bearing operation.

In any rolling bearing assembly or rolling bearing described above, the oil supply hole 2c may be located at such a position that the angle K is in the range of not less than 10° and not greater than 30°. In any rolling bearing assembly or rolling bearing described above, the number of the rolling elements 3 may be an odd number, and two oil supply holes 2c may be provided at 180-degree diagonal positions, respectively, in the outer ring 2. Alternatively, the number of the rolling elements may be an even number, and two oil supply holes 2c may be provided in the outer ring 2 such that when the circumferential position of any one of the rolling elements 3 coincides with that of one of the oil supply holes 2c, the other oil supply hole 2c is located at a circumferential position, in the outer ring 2, between a first rolling element 3 near a 180-degree diagonal position with respect to the one of the oil supply holes 2c and a second rolling element 3 adjacent to the first rolling element 3.

Although the preferred embodiments have been described above with reference to the accompanying drawings, those skilled in the art will readily conceive various changes and modifications within the framework of obviousness upon the reading of the specification herein. Accordingly, such changes and modifications are to be construed as included in the scope of the present invention which is to be determined by the appended claims.

REFERENCE NUMERALS

1 . . . Inner ring
2 . . . Outer ring
1a, 2a . . . Rolling surface
2b, 6b . . . Circumferential groove
2c . . . Oil supply hole
2e . . . Annular groove
3 . . . Rolling element
5 . . . Annular seal member
6, 8 . . . Housing
6c, 12b . . . lubricant oil introduction hole

What is claimed is:

1. A rolling bearing assembly comprising:
a rolling bearing including rolling elements interposed between rolling surfaces of an inner ring and an outer ring; and
a housing having an inner diameter surface on which the outer ring of the rolling bearing is mounted;
wherein two oil supply holes for lubricant oil supply are provided in the outer ring so as to communicate between an outer diameter surface of the outer ring and a position, near the rolling surface, in an inner peripheral surface of the outer ring;
wherein a circumferential flow passage is provided on a mounting surface between the outer diameter surface of the outer ring and the inner diameter surface of the housing on which the outer ring is mounted, the circumferential flow passage communicating with the two oil supply holes and extending in a circumferential direction;
wherein a lubricant oil introduction hole is provided in the housing so as to communicate with the circumferential flow passage at a circumferential position different from that of the two oil supply holes to supply a lubricant oil to the circumferential flow passage;
wherein the number of the rolling elements provided in the rolling bearing is an even number; and
wherein the two oil supply holes are provided in the outer ring such that when a circumferential position of any one of the rolling elements coincides with that of one of the oil supply holes, the other oil supply hole is located at an outer ring circumferential position between a first rolling element near a 180-degree diagonal position relative to the one of the oil supply holes and a second rolling element adjacent to the first rolling element.

2. The rolling bearing assembly as claimed in claim 1, wherein the circumferential flow passage is a circumferential groove provided on the outer diameter surface of the outer ring.

3. The rolling bearing assembly as claimed in claim 1, wherein the circumferential flow passage is a circumferential groove provided on the inner diameter surface of the housing.

4. The rolling bearing assembly as claimed in claim 1, wherein annular grooves are provided on the mounting surface between the outer diameter surface of the outer ring and the inner diameter surface of the housing, the annular groove being arranged on opposite sides of the circumferential flow passage in an axial direction; and
wherein an annular seal member is provided in each annular groove.

5. The rolling bearing assembly as claimed in claim 1, wherein a cross-sectional area of the circumferential flow passage obtained by viewing the circumferential flow passage that is cut by a plane including a bearing axial direction is not less than 22% of and not greater than 53% of a cross-sectional area of each of the oil supply holes obtained by viewing the oil supply holes when cut by a plane perpendicular to a direction in which the oil supply holes extend.

6. The rolling bearing assembly as claimed in claim 1, wherein a diameter of each of the oil supply holes is not less than 1.2 mm and not greater than 1.5 mm; and
wherein a cross-sectional area of the circumferential flow passage obtained by viewing the circumferential flow passage that is cut by a plane including a bearing axial direction is not less than 0.4 mm$^2$ and not greater than 0.6 mm$^2$.

7. The rolling bearing assembly as claimed in claim 1, wherein the lubricant oil supplied to the lubricant oil introduction hole is supplied in a form of air-oil or oil mist.

8. The rolling bearing assembly as claimed in claim 1, wherein the rolling elements are balls;
outlets of each of the oil supply holes are provided at positions in the outer ring, where the lubricant oil is supplied directly to each rolling element; and
each of the oil supply holes are located at such a position that when a center of the rolling element is located at a circumferential position that is the same as that of a center line of the respective oil supply hole, an angle formed between a bearing radial direction and a straight line connecting the center of the rolling element to an intersection point between the center line of the respective oil supply hole and an outer diameter surface of the rolling element, in a plane including the center of the rolling element and a bearing axis, is in a range of not less than 10° and not greater than 30°.

9. A rolling bearing assembly comprising:
a rolling bearing including rolling elements interposed between rolling surfaces of an inner ring and an outer ring; and
a housing having an inner diameter surface on which the outer ring of the rolling bearing is mounted;
wherein two oil supply holes for lubricant oil supply are provided in the outer ring so as to communicate between an outer diameter surface of the outer ring and the rolling surface of the outer ring;
wherein a circumferential flow passage is provided on a mounting surface between the outer diameter surface of the outer ring and the inner diameter surface of the housing on which the outer ring is mounted, the circumferential flow passage communicating with the two oil supply holes and extending in a circumferential direction;
wherein a lubricant oil introduction hole is provided in the housing so as to communicate with the circumferential flow passage at a circumferential position different from that of the two oil supply holes to supply a lubricant oil to the circumferential flow passage;
wherein the number of the rolling elements provided in the rolling bearing is an even number; and
wherein the two oil supply holes are provided in the outer ring such that when a circumferential position of any one of the rolling elements coincides with that of one of the oil supply holes, the other oil supply hole is located at an outer ring circumferential position between a first rolling element near a 180-degree diagonal position relative to the one of the oil supply holes and a second rolling element adjacent to the first rolling element.

10. A rolling bearing assembly comprising:

a rolling bearing including rolling elements interposed between rolling surfaces of an inner ring and an outer ring; and a housing having an inner diameter surface on which the outer ring of the rolling bearing is mounted;

wherein two oil supply holes for lubricant oil supply are provided in the outer ring so as to communicate between an outer diameter surface of the outer ring and a position, near the rolling surface, in an inner peripheral surface of the outer ring;

wherein a circumferential flow passage is provided on a mounting surface between the outer diameter surface of the outer ring and the inner diameter surface of the housing on which the outer ring is mounted, the circumferential flow passage communicating with the two oil supply holes and extending in a circumferential direction;

wherein a lubricant oil introduction hole is provided in the housing so as to communicate with the circumferential flow passage at a circumferential position different from that of the two oil supply holes to supply a lubricant oil to the circumferential flow passage; and wherein the two oil supply holes are provided in the outer ring such that when a circumferential position of any one of the rolling elements coincides with that of one of the oil supply holes, the other oil supply hole is located at an outer ring circumferential position between a first rolling element near a 180-degree diagonal position relative to the one of the oil supply holes and a second rolling element adjacent to the first rolling element.

\* \* \* \* \*